(12) United States Patent
Higuchi et al.

(10) Patent No.: US 11,198,443 B2
(45) Date of Patent: Dec. 14, 2021

(54) MESSAGE CONTENT SELECTION BASED ON UNCERTAINTY FOR COOPERATIVE VEHICULAR SYSTEMS

(71) Applicant: TOYOTA JIDOSHA KABUSHIKI KAISHA, Toyota (JP)

(72) Inventors: Takamasa Higuchi, Mountain View, CA (US); Onur Altintas, Mountain View, CA (US)

( * ) Notice: Subject to any disclaimer, the term of this patent is extended or adjusted under 35 U.S.C. 154(b) by 227 days.

(21) Appl. No.: 16/298,021

(22) Filed: Mar. 11, 2019

(65) Prior Publication Data
US 2020/0290631 A1 Sep. 17, 2020

(51) Int. Cl.
*B60W 50/02* (2012.01)
*G05D 1/02* (2020.01)
*G06K 9/00* (2006.01)
*H04W 4/40* (2018.01)

(52) U.S. Cl.
CPC ....... *B60W 50/0205* (2013.01); *G05D 1/0285* (2013.01); *G05D 1/0291* (2013.01); *G06K 9/00805* (2013.01); *H04W 4/40* (2018.02); *B60W 2050/0215* (2013.01); *B60W 2554/00* (2020.02); *B60W 2556/65* (2020.02); *G05D 2201/0213* (2013.01)

(58) Field of Classification Search
CPC ..... B60W 50/0205; B60W 2050/0215; B60W 2556/65; B60W 2554/00; G05D 2201/0213; G05D 1/0291; G05D 1/0285; G06K 9/00805; H04W 4/40
See application file for complete search history.

(56) References Cited

U.S. PATENT DOCUMENTS

| | | | |
|---|---|---|---|
| 9,432,929 B1* | 8/2016 | Ross | H04W 4/026 |
| 2017/0023945 A1* | 1/2017 | Cavalcanti | G08G 1/0116 |
| 2018/0188037 A1* | 7/2018 | Wheeler | H04L 67/12 |
| 2019/0073545 A1* | 3/2019 | Dolgov | G06K 9/627 |

* cited by examiner

*Primary Examiner* — Mathew Franklin Gordon
(74) *Attorney, Agent, or Firm* — Burbage Law, P.C.; Jon-Michael Burbage; Elizabeth Ruzich

(57) ABSTRACT

The disclosure includes embodiments for selecting Vehicle-to-Everything (V2X) data to be shared among vehicles in a cooperative vehicular system based on an uncertainty criterion. In some embodiments, a method for an ego vehicle includes: determining, by a sensor set of the ego vehicle, ego V2X data describing ego object information about a set of objects included in a roadway environment; receiving remote V2X data provided by a remote vehicle, where the remote V2X data describes remote object information about the set of objects from a perspective of the remote vehicle; determining uncertainty data describing an uncertainty about the ego object information based at least in part on an analysis of the ego object information relative to the remote object information; and updating the ego V2X data to form updated ego V2X data that describes ego object information that satisfies the uncertainty criterion.

20 Claims, 11 Drawing Sheets

MESSAGE CONTENT SELECTION BASED ON UNCERTAINTY FOR COOPERATIVE VEHICULAR SYSTEMS

BACKGROUND

The specification relates to providing a cooperative way for vehicles to share sensor measurements with one another to improve accuracy of the sensor measurements. Specifically, the specification relates to selecting Vehicle-to-Everything (V2X) data to be shared among vehicles in a cooperative vehicular system based on an uncertainty criterion.

As autonomous driving becomes increasingly important, it is desirable that vehicles have access to state information that precisely describes their own position in their driving environment as well as positions of other objects within this environment. Vehicles generally rely on their own onboard sensors to record sensor measurements that are used to construct their state information. Onboard sensors usually have limited spatial coverage; this is especially true in driving environments with various road objects (e.g., vehicles, buildings, etc.) because these road objects may obstruct the onboard sensor's fields of view. This creates a safety hazard. For example, an onboard sensor having a limited field of view may result in the onboard sensor failing to detect some road objects in the driving environment, and this failed detection may cause accidents (e.g., vehicles or pedestrians in a blind spot at an intersection) resulting in a loss of life, injuries, or a loss of property.

Vehicles include onboard units that analyze the sensor measurements recorded by their onboard sensors in order to generate state information that describes their driving environment and the objects in their driving environment. A vehicle's onboard unit may have increased uncertainty about the accuracy of its own sensor measurements. This uncertainty may be due to the limited spatial coverage of the sensors or other reasons. When a vehicle's onboard unit has uncertainty about its sensor measurements, then this uncertainty also applies to any state information that the onboard unit has determined because this state information is only as reliable as the sensor measurements that are used to generate the state information.

SUMMARY

Described are embodiments of an uncertainty reduction system installed in an electronic control unit (ECU) of a connected vehicle. The uncertainty reduction system solves the problem described in the preceding paragraphs. The uncertainty reduction system is operable to provide a cooperative way to share sensor measurements with other vehicles based on an uncertainty criterion so that uncertainty of the sensor measurements is reduced and accuracy of the sensor measurements is improved. In some embodiments, the uncertainty reduction system is operable to provide a guarantee that sensor measurements are accurate because they meet one or more uncertainty criterion.

In some embodiments, the uncertainty reduction system described herein determines state information. The state information includes digital data describing a state for a set of objects in a roadway environment based on its sensor measurements. The uncertainty reduction system determines how uncertain it is about the accuracy of different instances of the state information. Nearby vehicles can cooperate with one another using V2X communications to share their sensor measurements with one another. If the uncertainty exceeds a threshold, then the uncertainty reduction system uses V2X communications to receive sensor measurements from other nearby vehicles as well as estimation of uncertainty by these vehicles for these sensor measurements. Sensor measurements with more uncertainty are discarded and this process may be repeated. In this way, the uncertainty reduction system builds a set of state information with a low amount of uncertainty.

In some embodiments, the set of state information improves over time as more-and-more reliable data is identified by the uncertainty reduction system and unreliable data is discarded.

Embodiments described herein can be provided from perspectives of both an ego vehicle and a remote vehicle. In some embodiments, the uncertainty reduction system includes code and routines that are operable, when executed by a processor of an onboard unit of the ego vehicle or the remote vehicle, to cause the processor to execute one or more of the following procedures.

Procedure (1): The uncertainty reduction system of the ego vehicle causes a sensor set of the ego vehicle to record sensor measurements describing a position of the ego vehicle and positions of other objects within the environment of the ego vehicle. These sensor measurements are described by ego state data of the ego vehicle.

Procedure (2): The uncertainty reduction system of the ego vehicle identifies a set of objects described by the ego state data of the ego vehicle and positions of these objects within an operating environment that includes the ego vehicle, a remote vehicle and the objects identified here.

Procedure (3): The uncertainty reduction system of the ego vehicle determines, for each object identified at procedure (2), an uncertainty describing how uncertain the ego vehicle is about the accuracy of the position measurement for this particular object. This uncertainty is described by ego uncertainty data of the ego vehicle.

Procedure (4): The uncertainty reduction system of the remote vehicle causes a sensor set of the remote vehicle to record sensor measurements describing a position of the remote vehicle and positions of other objects within the environment of the remote vehicle. These sensor measurements are described by remote state data of the remote vehicle.

Procedure (5): The uncertainty reduction system of the remote vehicle identifies objects described by the remote state data of the remote vehicle and positions of these objects within an operating environment that includes the ego vehicle, the remote vehicle and the objects identified at procedures (2) and (5).

Procedure (6): The uncertainty reduction system of the remote vehicle determines, for each object identified at procedure (5), an uncertainty describing how uncertain the remote vehicle is about the accuracy of the position measurement for this particular object. This uncertainty is described by remote uncertainty data of the remote vehicle.

Procedure (7): The uncertainty reduction system of the remote vehicle retrieves threshold data that describes a predetermined uncertainty threshold.

Procedure (8): The uncertainty reduction system of the remote vehicle compares remote uncertainty data of each object to the uncertainty threshold described by the threshold data to determine whether the uncertainty threshold is satisfied for each object.

Procedure (9): The uncertainty reduction system of the remote vehicle generates remote V2X data including both (i) the remote state data and (ii) the remote uncertainty data of each object that satisfies the uncertainty threshold at procedure (8). For example, the remote V2X data only includes information about those objects that satisfy the uncertainty threshold at procedure (8).

Procedure (10). The uncertainty reduction system of the remote vehicle causes a V2X radio of the remote vehicle to broadcast a remote V2X message including the remote V2X data generated at procedure (9).

Procedure (11): A V2X radio of the ego vehicle receives the remote V2X message.

Procedure (12): The uncertainty reduction system of the ego vehicle parses the remote V2X data from the remote V2X message.

Procedure (13): The uncertainty reduction system of the ego vehicle updates ego uncertainty data of each object identified at procedure (2) based on the remote uncertainty data and the ego uncertainty data.

Procedure (14): The uncertainty reduction system of the ego vehicle updates the position measurement of each object identified at procedure (2) based on the remote state data.

Procedure (15): The uncertainty reduction system of the ego vehicle retrieves threshold data that describes a predetermined uncertainty threshold.

Procedure (16): The uncertainty reduction system of the ego vehicle compares the ego uncertainty data updated at procedure (13) to the uncertainty threshold described by the threshold data.

Procedure (17): The uncertainty reduction system of the ego vehicle generates updated ego V2X data including both (i) updated ego state data and (ii) updated ego uncertainty data of each object that satisfies the uncertainty threshold at procedure (16). For example, the updated ego V2X data only includes information of those objects that satisfy the uncertainty threshold at procedure (16).

Procedure (18): The uncertainty reduction system of the ego vehicle causes the V2X radio of the ego vehicle to broadcast an ego V2X message including the updated ego V2X data generated at procedure (17).

Procedure (19): The uncertainty reduction system of the ego vehicle modifies an operation of an ADAS system or autonomous driving system of the ego vehicle based on the position measurement of each object that is updated at procedure (14).

At least one benefit of the uncertainty reduction system described herein includes that it can guarantee that only updated ego V2X data that is sufficiently certain to satisfy the uncertainty criterion (e.g., only state information whose accuracy is sufficiently certain) is ever broadcast to other vehicles or used locally as an input to the autonomous driving system or ADAS system. By comparison, existing solutions do not guarantee that only state information whose accuracy is sufficiently certain is broadcast to other vehicles or used locally as an input to the autonomous driving system or ADAS system.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a method for an ego vehicle, including: determining, by a sensor set of the ego vehicle, ego V2X data describing ego object information about a set of objects included in a roadway environment; receiving remote V2X data provided by a remote vehicle, where the remote V2X data describes remote object information about the set of objects from a perspective of the remote vehicle; determining uncertainty data describing an uncertainty about the ego object information based at least in part on an analysis of the ego object information relative to the remote object information; and updating the ego V2X data to form updated ego V2X data that describes ego object information that satisfies an uncertainty criterion. Other embodiments of this aspect include corresponding computer systems, apparatus, and computer programs recorded on one or more computer storage devices, each configured to perform the actions of the methods.

Implementations may include one or more of the following features. The method further including transmitting a V2X message including the updated ego V2X data so that a receiver of the V2X message only receives updated ego V2X data that is sufficiently certain to satisfy the uncertainty criterion and the receiver has reduced uncertainty about the ego object information. The method where the uncertainty criterion is operable to provide a guarantee to the receiver that the updated ego V2X data is accurate. The method where updating the ego V2X data to form the updated ego V2X data includes applying the uncertainty criterion as an information suppressing technique that is operable to prevent redundant ego object information from being included in the V2X message so that a load of a network that transmits the V2X message is reduced. The method where the ego V2X data includes (1) ego state data describing a first state of the set of objects from a perspective the ego vehicle and (2) ego uncertainty data describing a first uncertainty of the first state from the perspective of the ego vehicle. The method where the first uncertainty of the first state is a function of an accuracy of the sensor set. The method where the remote V2X data includes (1) remote state data describing a second state of the set of objects from the perspective of the remote vehicle and (2) remote uncertainty data describing a second uncertainty of the second state from the perspective of the remote vehicle. The method where the first state and the second state describe the set of objects at a same time. The method where the analysis compares the first state and the first uncertainty to the second state and the second uncertainty. Implementations of the described techniques may include hardware, a method or process, or computer software on a computer-accessible medium.

One general aspect includes a system including an onboard vehicle computer system of an ego vehicle including a non-transitory memory storing computer code which, when executed by the onboard vehicle computer system, causes the onboard vehicle computer system to: determine, by a sensor set of the ego vehicle, ego V2X data describing ego object information about a set of objects included in a roadway environment; receive remote V2X data provided by a remote vehicle, where the remote V2X data describes remote object information about the set of objects from a perspective of the remote vehicle; determine uncertainty data describing an uncertainty about the ego object information based at least in part on an analysis of the ego object information relative to the remote object information; and update the ego V2X data to form updated ego V2X data that describes ego object information that satisfies an uncertainty criterion. Other embodiments of this aspect include corresponding computer systems, apparatus, and computer programs recorded on one or more computer storage devices, each configured to perform the actions of the methods.

Implementations may include one or more of the following features. The system where the computer code, when executed by the onboard vehicle computer system, causes the onboard vehicle computer system further to: transmit a V2X message including the updated ego V2X data so that a receiver of the V2X message only receives updated ego V2X data that is sufficiently certain to satisfy the uncertainty criterion and the receiver has reduced uncertainty about the ego object information. The system where the uncertainty criterion is operable to provide a guarantee to the receiver that the updated ego V2X data is accurate. The system where the computer code, when executed by the onboard vehicle computer system, causes the onboard vehicle computer system to update the ego V2X data to form the updated ego V2X data at least by: applying the uncertainty criterion as an information suppressing technique that is operable to prevent redundant ego object information from being included in the V2X message so that a load of a network that transmits the V2X message is reduced. The system where the ego V2X data includes (1) ego state data describing a first state of the set of objects from a perspective the ego vehicle and (2) ego uncertainty data describing a first uncertainty of the first state from the perspective of the ego vehicle. The system where the first uncertainty of the first state is a function of an accuracy of the sensor set. The system where the remote V2X data includes (1) remote state data describing a second state of the set of objects from the perspective of the remote vehicle and (2) remote uncertainty data describing a second uncertainty of the second state from the perspective of the remote vehicle. The system where the analysis compares the first state and the first uncertainty to the second state and the second uncertainty. Implementations of the described techniques may include hardware, a method or process, or computer software on a computer-accessible medium.

One general aspect includes a computer program product including a non-transitory memory of an onboard vehicle computer system of an ego vehicle storing computer-executable code that, when executed by a processor, causes the processor to: determine, by a sensor set of the ego vehicle, ego V2X data describing ego object information about a set of objects included in a roadway environment; receive remote V2X data provided by a remote vehicle, where the remote V2X data describes remote object information about the set of objects from a perspective of the remote vehicle; determine uncertainty data describing an uncertainty about the ego object information based at least in part on an analysis of the ego object information relative to the remote object information; and update the ego V2X data to form updated ego V2X data that describes ego object information that satisfies an uncertainty criterion. Other embodiments of this aspect include corresponding computer systems, apparatus, and computer programs recorded on one or more computer storage devices, each configured to perform the actions of the methods.

Implementations may include one or more of the following features. The computer program product where the computer-executable code, when executed by the processor, causes the processor further to: transmit a V2X message including the updated ego V2X data so that a receiver of the V2X message only receives updated ego V2X data that is sufficiently certain to satisfy the uncertainty criterion and the receiver has reduced uncertainty about the ego object information. The computer program product where the uncertainty criterion is operable to provide a guarantee to the receiver that the updated ego V2X data is accurate. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
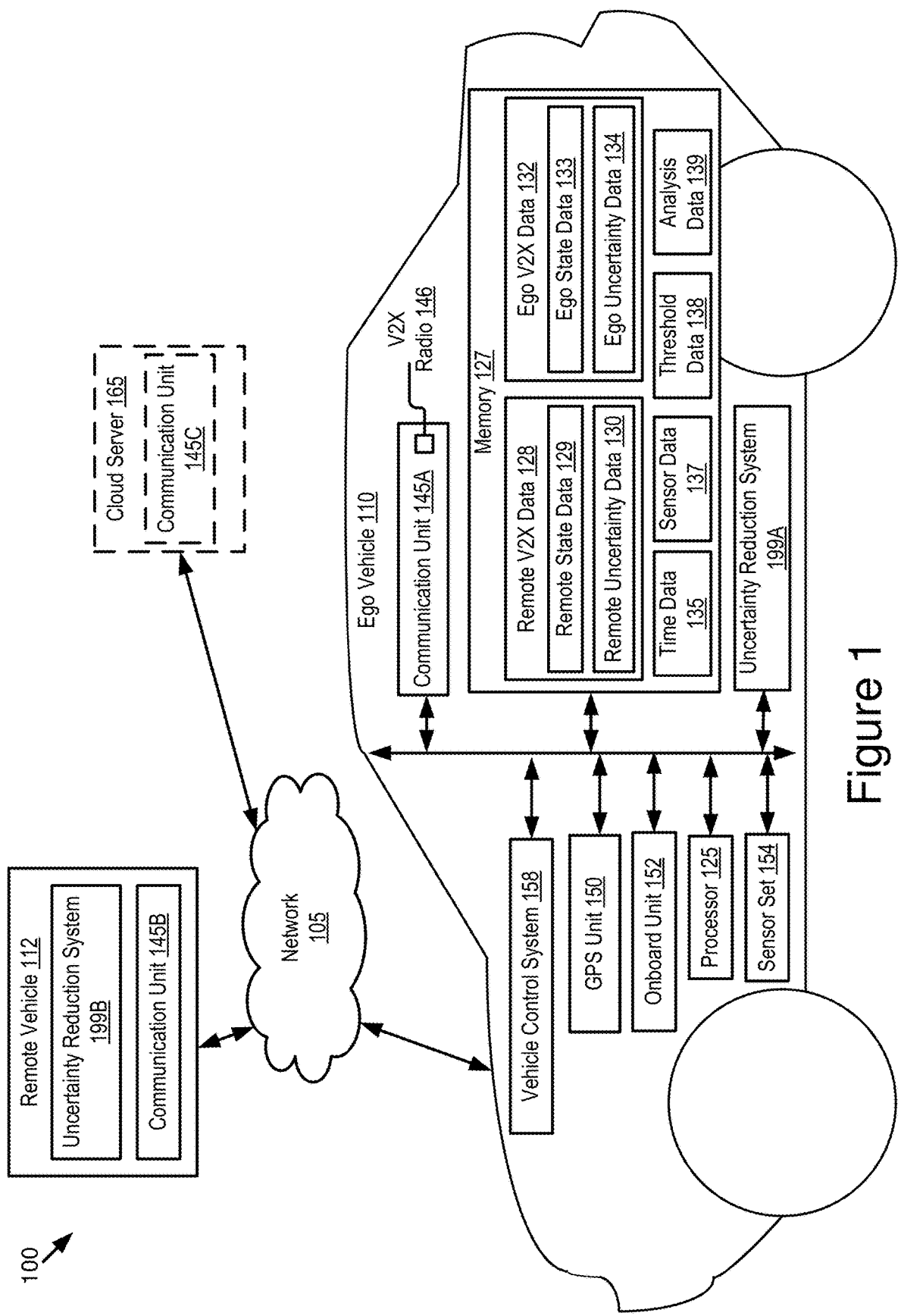
FIG. 1 is a block diagram illustrating an operating environment for an uncertainty reduction system according to some embodiments.

In a cooperative vehicular system, vehicles make use of vehicular networks (e.g., DSRC, ITS-G5, etc.) to mutually exchange their own state (e.g., a position, a speed, an acceleration, etc.) and information about objects that are perceived by their local onboard sensors. The cooperative vehicular system allows vehicles to perceive the objects beyond the fields of view of their local onboard sensors and thus improve the completeness and accuracy of environmental perception. Example V2X messages exchanged in a cooperative vehicular system include, but are not limited to: a Basic Safety Message (BSM) or a Cooperative Awareness Message (CAM), which includes state information (e.g., a position, a speed, an acceleration, etc.) of a transmitting vehicle; and a Cooperative Perception Message (CPM) which includes information about road objects that are perceived by the onboard sensor(s) of the transmitting vehicle.

For example, a cooperative vehicular system is one in which connected vehicles mutually share their sensor measurements with one another using V2X communications. By way of examples, consider a simplified operating environment that includes a remote vehicle and an ego vehicle. The remote vehicle generates a V2X message that includes sensor data describing sensor measurements that are recorded by onboard sensors of the remote vehicle. The remote vehicle then transmits the V2X message to an ego vehicle. The ego vehicle receives the V2X message and provides the sensor data to an autonomous driving system of the ego vehicle so that autonomous driving decisions of the ego vehicle can be made based on the sensor measurements recorded by the remote vehicle.

Existing solutions for the cooperative vehicular system have limitations that render them inadequate because they do not attempt to eliminate sensor measurements whose accuracy is determined to be uncertain. In addition, DSRC or ITS-G5 networks used in the cooperative vehicular system have limited bandwidth. The frequency of message transmissions and the number of objects that can be included in a message are both bounded by bandwidth constraints. For example, when a vehicle perceives a large number of objects in the fields of view of its sensors, it may not be able to include information about all of these perceived objects into a CPM due to bandwidth constraints. However, existing solutions for cooperative perception do not provide specific criteria to decide whether or not to include information about each perceived object into a transmission.

By comparison, the uncertainty reduction system described herein for the cooperative vehicular system is different from the existing solutions. For example, continuing with the above example in the simplified operating environment that includes the remote vehicle and the ego vehicle, an instance of the uncertainty reduction system is installed in an onboard unit of each of the ego vehicle and the remote vehicle. The remote vehicle transmits a V2X message including sensor measurements recorded by its onboard sensors, where the V2X message includes digital data that describes how uncertain the remote vehicle is about the accuracy of its own sensor measurements. In this way, it can guarantee that the ego vehicle only considers sensor measurements whose accuracy has a certainty that meets a predefined threshold. The existing solutions do not provide a similar guarantee.

Furthermore, in some embodiments described herein the uncertainty reduction system provides a V2X-message transmission mechanism that determines which object information to be included in a V2X message based on an uncertainty criterion so that a receiver of the V2X message only receives object information that is sufficiently certain to satisfy the uncertainty criterion and the receiver has reduced uncertainty about the object information. Furthermore, the uncertainty reduction system helps to reduce a network load by suppressing transmissions of redundant object information while maintaining the vehicles' awareness of road objects.

For example, the uncertainty reduction system incorporates object information corresponding to objects that satisfy an uncertainty threshold into the V2X message so that other receivers that receive the V2X message can improve accuracy of their sensor measurements based on the V2X message. In another example, the uncertainty reduction system incorporates object information of a particular object into the V2X message based on an estimated uncertainty of the object from perspectives of potential receivers of the V2X message. In this way, the uncertainty reduction system transmits object information about one or more objects to the potential receivers when this object information is expected to help the potential receivers to reduce their uncertainty on the one or more objects. Other example advantages of the uncertainty reduction system described herein are also possible.

Example Overview

Referring to FIG. 1, depicted is an operating environment 100 for an uncertainty reduction system 199 according to some embodiments. The operating environment 100 may include one or more of the following elements: an ego vehicle 110; and a remote vehicle 112. Optionally, the operating environment includes a cloud server 165. These elements of the operating environment 100 may be communicatively coupled to a network 105.

Although one ego vehicle 110, one remote vehicle 112, one cloud server 165 and one network 105 are depicted in FIG. 1, in practice the operating environment 100 may include any number of ego vehicles 110, any number of remote vehicles 112, any number of cloud servers 165 and any number of networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, 5G-V2X or any other mobile data network or combination of mobile data networks. Further, the network 105 may include one or more IEEE 802.11 wireless networks.

In some embodiments, the network 105 is a V2X network, which is a wireless network for sending and receiving V2X messages among various endpoints (e.g., vehicles, roadside equipment, etc.) that each include a V2X radio. Examples of a wireless message (e.g., a V2X message) described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message, an LTE-V2N message, etc.); a 5G-V2X message; and a millimeter wave message, etc.

In some embodiments, one or more of the ego vehicle 110 and the remote vehicle 112 may be DSRC-equipped vehicles. The network 105 may include one or more communication channels shared among the ego vehicle 110, the remote vehicle 112 and one or more roadside units (RSUs). The one or more communication channels may include DSRC, LTE-V2X, 5G-V2X, full-duplex wireless communication or any other wireless communication protocol. For example, the network 105 may be used to transmit a DSRC message, DSRC probe or BSM including any of the data described herein.

In some embodiments, a DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by the ADAS system of a modern vehicle require positioning information that describes the geographic position of the vehicle with lane-level accuracy. In addition, the current standard for DSRC requires that the geographic position of the vehicle be described with lane-level accuracy.

As used herein, the words "geographic location," "location," "geographic position" and "position" refer to a latitude and longitude of an object (or, a latitude, longitude, and elevation of an object) such as a connected vehicle. The example embodiments described herein provide positioning information that describes a geographic position of a vehicle with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

The ego vehicle 110 may be any type of vehicle. For example, the ego vehicle 110 may include one of the following types of vehicles: a car; a truck; a sports utility vehicle; a bus; a semi-truck; a drone or any other roadway-based conveyance.

In some embodiments, the ego vehicle 110 may include an autonomous vehicle or a semi-autonomous vehicle. For example, the ego vehicle 110 may include an Advanced Driver-Assistance System (e.g., an ADAS system). The ADAS system may provide some or all of the functionality that provides autonomous functionality.

The ego vehicle 110 may include one or more of the following elements: a processor 125; a memory 127; a communication unit 145A; a GPS unit 150; an onboard unit 152; a sensor set 154; a vehicle control system 158; and an uncertainty reduction system 199A. These elements of the ego vehicle 110 may be communicatively coupled to one another via a bus.

In some embodiments, the ego vehicle 110 and the remote vehicle 112 may have a similar structure, and the description provided herein for the ego vehicle 110 may also be applicable to the remote vehicle 112. For example, the remote vehicle 112 includes, among others, an uncertainty reduction system 199B and a communication unit 145B. The uncertainty reduction systems 199A and 199B may provide similar functionality and may be referred to herein as "uncertainty reduction system 199" individually or collectively. The communication units 145A and 145B and a communication unit 145C in the cloud server 165 may provide similar functionality and may be referred to herein as "communication unit 145" individually or collectively.

In some embodiments, the processor 125 and the memory 127 may be elements of an onboard vehicle computer system (such as computer system 200 described below with reference to FIG. 2). The onboard vehicle computer system may be operable to cause or control the operation of the uncertainty reduction system 199. The onboard vehicle computer system may be operable to access and execute the data stored on the memory 127 to provide the functionality described herein for the uncertainty reduction system 199 or its elements (see, e.g., FIG. 2).

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 110 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The ego vehicle 110 may include one or more memories 127.

The memory 127 of the ego vehicle 110 may store one or more of the following elements: remote V2X data 128; ego V2X data 132; time data 135; sensor data 137; threshold data 138; and analysis data 139.

The ego V2X data 132 includes ego state data 133 and ego uncertainty data 134. For example, the ego state data 133 includes state data describing a first state for a set of objects in the roadway environment that are identified by the ego vehicle 110 from a perspective of the ego vehicle 110, and the ego uncertainty data 134 includes uncertainty data describing a first uncertainty for the first state from the perspective of the ego vehicle 110. In another example, the ego state data 133 only includes state data of those objects identified by the ego vehicle 110 that satisfy an uncertainty criterion (referred to as, e.g., "updated ego state data"), and the ego uncertainty data 134 only includes uncertainty data of those objects that satisfy the uncertainty criterion (referred to as, e.g., "updated ego uncertainty data").

An example of the ego V2X data 132 is described below with reference to FIG. 8.

The remote V2X data 128 includes digital data received from the remote vehicle 112 via a remote V2X message. In some embodiments, the remote V2X data 128 includes remote state data 129 and remote uncertainty data 130. For example, the remote state data 129 includes state data describing a second state for a set of objects in the roadway environment that are identified by the remote vehicle 112 from a perspective of the remote vehicle 112, and the remote uncertainty data 130 includes uncertainty data describing a second uncertainty for the second state from the perspective of the remote vehicle 112. In another example, the remote state data 129 only includes state data of those objects identified by the remote vehicle 112 that satisfy an uncertainty criterion, and the remote uncertainty data 130 only includes uncertainty data of those objects that satisfy the uncertainty criterion.

An example of the remote V2X data 128 is described below with reference to FIG. 8.

The time data 135 includes digital data that describes a designated time period (or a designated time interval) between two consecutive transmissions of V2X messages by the ego vehicle 110.

The sensor data 137 includes digital data describing one or more sensor measurements recorded by the sensor set 154 of the ego vehicle 110.

The threshold data 138 includes digital data describing an uncertainty threshold. For example, if an uncertainty of a state of an object measured by the ego vehicle 110 exceeds the uncertainty threshold, then it is determined that the object (or the uncertainty associated with the measured state of the object) does not satisfy the uncertainty threshold, which indicates that this measurement for the state of the object has inacceptable accuracy. On the other hand, if the uncertainty of the state of the object measured by the ego vehicle 110 is not greater than the uncertainty threshold, then it is determined that the object (or the uncertainty associated with the measured state of the object) satisfies the uncertainty threshold, which indicates that this measurement for the state of the object has acceptable accuracy.

In some embodiments, the uncertainty threshold can be determined by the uncertainty reduction system 199 based on an analysis of historical remote V2X data, historical ego V2X data or a combination thereof. In some embodiments, the uncertainty threshold can be predetermined by a driver of the ego vehicle 110. Other ways to determine the uncertainty threshold are possible.

The analysis data 139 includes digital data describing an analysis of the ego V2X data 132 relative to the remote V2X data 128. For example, the analysis includes comparing the ego V2X data 132 to the remote V2X data 128.

The communication unit 145 transmits and receives data to and from the network 105 or to another communication channel. In some embodiments, the communication unit 145 may include a DSRC transceiver, a DSRC receiver and other hardware or software necessary to make the ego vehicle 110 a DSRC-enabled device. For example, the communication unit 145 includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The communication unit 145 includes a V2X radio 146. The V2X radio 146 is an electronic device that includes a V2X transmitter and a V2X receiver and is operable to send and receive wireless messages via any V2X protocol. For example, the V2X radio 146 is operable to send and receive wireless messages via DSRC. The V2X transmitter is operable to transmit and broadcast DSRC messages over the 5.9 GHz band. The V2X receiver is operable to receive DSRC messages over the 5.9 GHz band.

In some embodiments, the GPS unit 150 is a conventional GPS unit of the ego vehicle 110. For example, the GPS unit 150 may include hardware that wirelessly communicates with a GPS satellite to retrieve data that describes a geographic location of the ego vehicle 110. For example, the GPS unit 150 retrieves GPS data describing the geographic location of the ego vehicle 110 from one or more GPS satellites. In some embodiments, the GPS unit 150 is a DSRC-compliant GPS unit of the ego vehicle 110 that is operable to provide GPS data describing the geographic location of the ego vehicle 110 with lane-level accuracy.

The onboard unit 152 can include one or more processors and one or more memories. For example, the onboard unit 152 includes an electronic control unit (ECU). The ECU is an embedded system in automotive electronics that controls one or more of electrical systems or subsystems in the ego vehicle 110. Types of the ECU include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the uncertainty reduction system 199 of the ego vehicle 110 is installed in the onboard unit 152.

The sensor set 154 includes one or more sensors that are operable to measure a roadway environment outside of the ego vehicle 110. For example, the sensor set 154 may include one or more sensors that record one or more physical characteristics of the roadway environment that is proximate to the ego vehicle 110. The memory 127 may store sensor data that describes the one or more physical characteristics recorded by the sensor set 154. The roadway environment outside of the ego vehicle 110 may include the remote vehicle 112 and any other objects, and so, one or more of the sensors of the sensor set 154 may record sensor data that describes information about the remote vehicle 112 and any other objects.

In some embodiments, the sensor set 154 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The vehicle control system 158 may include a system that controls an operation of the ego vehicle 110. For example, the vehicle control system 158 may include one or more of an ADAS system 159 and an autonomous driving system 160 as shown in FIG. 2.

In some embodiments, the ADAS system 159 is a conventional ADAS system that controls operation of the ego vehicle 110. In some embodiments, the ADAS system 159 may also include any software or hardware included in the ego vehicle 110 that makes the ego vehicle 110 an autonomous vehicle or a semi-autonomous vehicle.

Examples of the ADAS system 159 may include one or more of the following elements of the ego vehicle 110: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In some embodiments, the autonomous driving system 160 may include any software or hardware included in the ego vehicle 110 that makes the ego vehicle 110 an autonomous vehicle. In some embodiments, the ego vehicle 110 includes either the autonomous driving system 160 or the ADAS system 159. In some other embodiments, the ego vehicle 110 includes both the autonomous driving system 160 and the ADAS system 159.

In some embodiments, the uncertainty reduction system 199 includes software that is operable, when executed by the processor 125, to cause the processor 125 to execute one or more steps of methods 300, 400, 500 and 600 described below with reference to FIGS. 3-6B and one or more operations described below with reference to FIGS. 7-8.

In some embodiments, the uncertainty reduction system 199 may be implemented using hardware including a field-programmable gate array ("FPGA") or an application-specific integrated circuit ("ASIC"). In some other embodiments, the uncertainty reduction system 199 may be implemented using a combination of hardware and software. The uncertainty reduction system 199 may be stored in a combination of the devices (e.g., servers or other devices), or in one of the devices.

In some embodiments, the uncertainty reduction system 199 includes code and routines that are operable, when executed by the processor 125 of the ego vehicle 110 or the remote vehicle 112, to cause the processor 125 to execute one or more of the following procedures.

Procedure (1): The uncertainty reduction system 199 of the ego vehicle 110 causes the sensor set 154 of the ego vehicle 110 to record sensor measurements describing the ego vehicle and other objects within an environment of the ego vehicle 110. These sensor measurements are described by ego state data of the ego vehicle 110.

Procedure (2): The uncertainty reduction system 199 of the ego vehicle 110 identifies a set of objects described by the ego state data of the ego vehicle 110 and a state of these objects within an operating environment that includes the ego vehicle 110, the remote vehicle 112 and the objects identified here.

Procedure (3): The uncertainty reduction system 199 of the ego vehicle 110 determines, for each object identified at procedure (2), an uncertainty describing how uncertain the ego vehicle 110 is about the accuracy of the state measurement for this particular object. This uncertainty is described by ego uncertainty data of the ego vehicle 110.

Procedure (4): The uncertainty reduction system 199 of the remote vehicle 112 causes a sensor set 154 of the remote vehicle 112 to record sensor measurements describing the remote vehicle 112 and other objects within the environment of the remote vehicle 112. These sensor measurements are described by remote state data of the remote vehicle 112.

Procedure (5): The uncertainty reduction system 199 of the remote vehicle 112 identifies objects described by the remote state data of the remote vehicle 112 and a state of these objects within an operating environment that includes the ego vehicle 110, the remote vehicle 112 and the objects identified at procedures (2) and (5).

Procedure (6): The uncertainty reduction system 199 of the remote vehicle 112 determines, for each object identified at procedure (5), an uncertainty describing how uncertain the remote vehicle 112 is about the accuracy of the state measurement for this particular object. This uncertainty is described by remote uncertainty data of the remote vehicle 112.

Procedure (7): The uncertainty reduction system 199 of the remote vehicle 112 retrieves threshold data that describes a predetermined uncertainty threshold.

Procedure (8): The uncertainty reduction system 199 of the remote vehicle 112 compares remote uncertainty data of each object to the uncertainty threshold described by the threshold data to determine whether the uncertainty threshold is satisfied for each object.

Procedure (9): The uncertainty reduction system 199 of the remote vehicle 112 generates remote V2X data including both (i) the remote state data and (ii) the remote uncertainty data of each object that satisfies the uncertainty threshold at procedure (8). For example, the remote V2X data only includes information of those objects that satisfy the uncertainty threshold at procedure (8).

Procedure (10). The uncertainty reduction system 199 of the remote vehicle 112 causes a V2X radio 146 of the remote vehicle 112 to broadcast a remote V2X message including the remote V2X data generated at procedure (9).

Procedure (11): A V2X radio 146 of the ego vehicle 110 receives the remote V2X message.

Procedure (12): The uncertainty reduction system 199 of the ego vehicle 110 parses the remote V2X data from the remote V2X message.

Procedure (13): The uncertainty reduction system 199 of the ego vehicle 110 updates the ego uncertainty data of each object identified at procedure (2) based on the remote uncertainty data and the ego uncertainty data.

Procedure (14): The uncertainty reduction system 199 of the ego vehicle 110 updates the state measurement of each object identified at procedure (2) based on the remote state data.

Procedure (15): The uncertainty reduction system 199 of the ego vehicle 110 retrieves threshold data that describes a predetermined uncertainty threshold.

Procedure (16): The uncertainty reduction system 199 of the ego vehicle 110 compares the ego uncertainty data updated at procedure (13) to the uncertainty threshold described by the threshold data.

Procedure (17): The uncertainty reduction system 199 of the ego vehicle 110 generates updated ego V2X data including both (i) updated ego state data and (ii) updated ego uncertainty data of each object that satisfies the uncertainty threshold at procedure (16). For example, the updated ego V2X data only includes information of those objects that satisfy the uncertainty threshold at procedure (16).

Procedure (18): The uncertainty reduction system 199 of the ego vehicle 110 causes the V2X radio 146 of the ego vehicle 110 to broadcast an ego V2X message including the updated ego V2X data generated at procedure (17).

Procedure (19): The uncertainty reduction system 199 of the ego vehicle 110 modifies an operation of the ADAS system 159 or autonomous driving system 160 of the ego vehicle 110 based on the state measurement of each object that is updated at procedure (14).

The uncertainty reduction system 199 is described below in more detail with reference to FIGS. 2-8.

The cloud server 165 includes a processor-based computing device which is capable of providing a cloud-based service to one or more of the ego vehicle 110 and the remote vehicle 112. The cloud server 165 includes the communication unit 145C. Description for the communication unit 145C is not repeated here.

As described herein, a V2X message (e.g., a BSM, CAM, CPM) includes object information (e.g., state data and uncertainty data) of road objects which is perceived by onboard sensors of a sender of the V2X message. For example, a V2X message includes [$(S_{i,1}(t), U_{i,1}(t)), (S_{i,2}(t), U_{i,2}(t)), \ldots, (S_{i,j}(t), U_{i,j}(t)), \ldots, (S_{i,Ni}(t), U_{i,Ni}(t))$], where $S_{i,j}(t)$ represents a measurement of a state of an object j by a sender i, and $U_{i,j}(t)$ represents a measurement of an uncertainty of the object j by the sender i, and $N_i$ represents a total number of the objects identified by the sender i. For a BSM or CAM, the V2X message only includes a state of the objects that is identified by the sender i. When the sender i obtains a V2X message (either received from another vehicle, or sent by the sender i itself), it updates the state $S_{i,j}(t)$ and the uncertainty $U_{i,j}(t)$ of each object j stored in its local storage. The object state can be updated by fusing a current state stored in the local storage with a new measurement included in the V2X message with an application of a fusing technique such as a Kalman filtering technique. The sender i can be the ego vehicle 110 that sends an ego V2X message or the remote vehicle 112 that sends a remote V2X message.

Example Computer System

Figure 2:
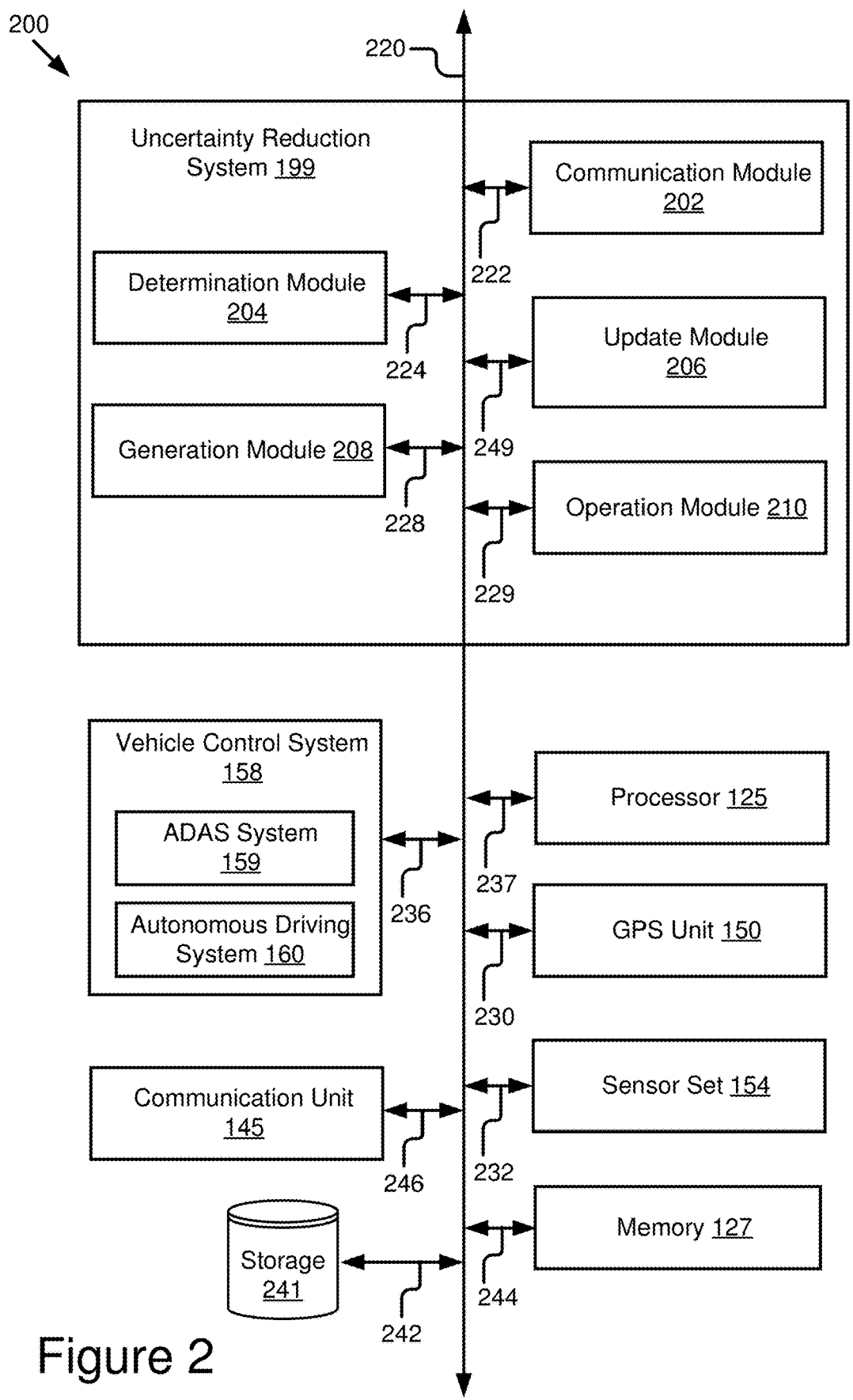
FIG. 2 is a block diagram illustrating an example computer system including an uncertainty reduction system according to some embodiments.

Referring now to FIG. 2, depicted is a block diagram illustrating an example computer system 200 including the uncertainty reduction system 199 according to some embodiments. In some embodiments, the computer system 200 may include a special-purpose computer system that is programmed to perform one or more steps of methods 300, 400, 500 and 600 described below with reference to FIGS. 3-6B and one or more operations described below with reference to FIGS. 7-8.

In some embodiments, the computer system 200 may be an element of the ego vehicle 110. In some embodiments, the computer system 200 may be an onboard vehicle computer of the ego vehicle 110. In some embodiments, the computer system 200 may include an engine control unit, head unit or some other processor-based computing device of the ego vehicle 110.

The computer system 200 may include one or more of the following elements according to some examples: the uncertainty reduction system 199; the processor 125; the communication unit 145; the sensor set 154; the GPS unit 150; the memory 127; the vehicle control system 158 including one or more of the ADAS system 159 and the autonomous driving system 160; and a storage 241. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The sensor set 154 is communicatively coupled to the bus 220 via a signal line 232. The GPS unit 150 is communicatively coupled to the bus 220 via a signal line 230. The storage 241 is communicatively coupled to the bus 220 via a signal line 242. The memory 127 is communicatively coupled to the bus 220 via a signal line 244. The vehicle control system 158 is communicatively coupled to the bus 220 via a signal line 236.

The following elements of the computer system 200 are described above with reference to FIG. 1, and so, those descriptions will not be repeated here: the processor 125; the communication unit 145; the sensor set 154; the GPS unit 150; the vehicle control system 158; the ADAS system 159; the autonomous driving system 160; and the memory 127.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the uncertainty reduction system 199 includes: a communication module 202; a determination module 204; an update module 206; a generation module 208; and an operation module 210. These components of the uncertainty reduction system 199 are communicatively coupled to each other via the bus 220. In some embodiments, components of the uncertainty reduction system 199 can be stored in a single server or device. In some other embodiments, components of the uncertainty reduction system 199 can be distributed and stored across multiple servers or devices. For example, some of the components of the uncertainty reduction system 199 may be distributed across the remote vehicle 112 and the ego vehicle 110.

The communication module 202 can be software including routines for handling communications between the uncertainty reduction system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. For example, the communication module 202 receives or transmits, via the communication unit 145, a V2X message. The communication module 202 may send or receive any of the data or messages described above with reference to FIG. 1 via the communication unit 145.

In some embodiments, the communication module 202 receives data from components of the uncertainty reduction system 199 and stores the data in one or more of the storage 241 and the memory 127. For example, the communication module 202 receives any of the data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the uncertainty reduction system 199. For example, the communication module 202 may handle communications among the determination module 204, the update module 206, the generation module 208 and the operation module 210. Any of these modules may cause the communication module 202 to communicate with the other elements of the computer system 200 or the operating environment 100 (via the communication unit 145). For example, the determination module 204 may use the communication module 202 to communicate with the sensor set 154 and cause the sensor set 154 to record sensor data.

The determination module 204 can be software including routines for determining ego V2X data that describes ego object information from a perspective of the ego vehicle. In some embodiments, the determination module 204 can be stored in the memory 127 of the computer system 200 and can be accessible and executable by the processor 125. The determination module 204 may be adapted for cooperation and communication with the processor 125 and other components of the computer system 200 via a signal line 224.

In some embodiments, the determination module 204 may operate one or more sensors of the sensor set 154 to generate sensor data describing one or more measurements of the sensor set 154. The determination module 204 may cause the sensor data to be stored in the memory 127. Specifically, the determination module 204 may operate one or more sensors included in the sensor set 154 to record sensor data describing measurements of a physical environment proximate to the computer system 200. The remote vehicle 112 and other objects may be located in the physical environment proximate to the ego vehicle 110 that includes the computer system 200.

In some embodiments, the determination module 204 is operable to determine, via the sensor set 154 of the ego vehicle 110, ego V2X data describing ego object information about a set of objects included in a roadway environment. The ego object information may include, for example, state information or any other information about the set of objects in the roadway environment from the perspective of the ego vehicle 110. In some embodiments, the ego V2X data includes (1) ego state data describing a first state of the set of objects from the perspective the ego vehicle 110 and (2) ego uncertainty data describing a first uncertainty of the first state from the perspective of the ego vehicle 110. In some embodiments, the first state associated with the set of objects includes one or more of the following for each object in the set: a position; an object type; a speed; an acceleration or a deceleration; an object size; and a heading angle, etc.

Specifically, the determination module 204 receives sensor data describing one or more sensor measurements from the sensor set 154 of the ego vehicle 110. The determination module 204 determines, based on the sensor data, ego state data describing the first state of the set of objects in the roadway environment from the perspective of the ego vehicle 110. For example, the determination module 204 identifies the set of objects based on the sensor data and generates the ego state data describing the first state of the set of objects based on the sensor data.

The determination module 204 determines the ego uncertainty data describing the first uncertainty of the first state from the perspective of the ego vehicle based on one or more uncertainty-related factors. The first uncertainty of the first state is a function of an accuracy of the sensor set 154. For example, the first uncertainty of the first state changes over time as a coverage of the sensor set 154 on the set of objects changes over time due to a movement of the ego vehicle 110 or a mobility of the set of objects. The one or more uncertainty-related factors may affect the ego vehicle's judgment on how uncertain the ego vehicle 110 is about a measurement accuracy of the sensor set 154. Examples of the one or more uncertainty-related factors include, but are not limited to, one or more of the following: a speed of the ego vehicle 110 (e.g., when the ego vehicle 110 travels with a fast speed, the accuracy of the sensor set 154 may decrease); a spatial coverage of sensors in the sensor set 154; a resolution of the sensors in the sensor set 154; a type of an identified object (e.g., a static object or a mobile object); a weather condition (e.g., the accuracy of the sensor set 154 may be better in a sunny day than that in a cloudy or rainy day); and a day of time (e.g., a measurement accuracy of a camera may be better during day time than that of night time); etc. For example, a varying rate for ego uncertainty data of each object identified in the set of objects is determined based on an object type of the corresponding object (e.g., a mobile object may have a higher uncertainty varying rate than that of a static object).

Then, the determination module 204 generates the ego V2X data to include (1) the ego state data and (2) the ego uncertainty data described above. For example, for each object j identified in the roadway environment, the determination module 204 generates state data describing a state $S_{e,j}(t)$ of the object j and uncertainty data describing an uncertainty $U_{e,j}(t)$ for the state $S_{e,j}(t)$ of the object j at a time t (where the subscript "e" in $S_{e,j}(t)$ and $U_{e,j}(t)$ represents the ego vehicle 110 and the subscript "j" represents the object j, $1 \leq j \leq N_e$). The state $S_{e,j}(t)$ of the object j includes, for example, a position, an object type (e.g., a vehicle, a pedestrian, etc.), a speed, an acceleration, an object size, and a heading angle, etc., of the object j determined by the ego vehicle 110. The uncertainty $U_{e,j}(t)$ of the object j typically increases over time at a rate which is dependent on the object type unless the ego vehicle 110 obtains any updates about the object j (e.g., an uncertainty about a state of a vehicle can grow faster than that of a stationary obstacle on a road because of mobility of the vehicle). Assume that a total number of objects in the set of objects identified by the ego vehicle 110 is $N_e$ (e.g., $N_e$ is an integer equal to or greater than 1). Then, the determination module 204 generates the ego state data describing the first state of $S_e(t)=[S_{e,1}(t), S_{e,2}(t), \ldots, S_{e,j}(t), \ldots, S_{e,Ne}(t)]$ and the ego uncertainty data describing the first uncertainty of $U_e(t)=[U_{e,1}(t), U_{e,2}(t), \ldots, U_{e,j}(t), \ldots, U_{e,Ne}(t)]$ for the set of objects. Then, the ego V2X data includes $S_e(t)=[S_{e,1}(t), S_{e,2}(t), \ldots, S_{e,j}(t), \ldots, S_{e,Ne}(t)]$ and $U_e(t)=[U_{e,1}(t), U_{e,2}(t), \ldots, U_{e,j}(t), \ldots, U_{e,Ne}(t)]$ for the set of $N_e$ objects.

The update module 206 can be software including routines that, when executed by the processor 125, cause the processor 125 to update the ego V2X data of the ego vehicle 110. In some embodiments, the update module 206 can be a set of instructions stored in the memory 127 of the computer system 200 and can be accessible and executable by the processor 125. The update module 206 may be adapted for cooperation and communication with the processor 125 and other components of the computer system 200 via a signal line 249.

In some embodiments, the update module 206 receives a remote V2X message including remote V2X data provided by the remote vehicle 112. The remote V2X data describes remote object information about a set of objects from a perspective of the remote vehicle 112. The remote object information may include, for example, state information or any other information about the set of objects in the roadway environment from the perspective of the remote vehicle 112. In some embodiments, the remote V2X data includes (1) remote state data describing a second state of the set of objects from the perspective of the remote vehicle 112 and (2) remote uncertainty data describing a second uncertainty of the second state from the perspective of the remote vehicle 112.

In some embodiments, the first state identified by the ego vehicle 110 and the second state identified by the remote vehicle 112 describe the set of objects at a same time respectively. In some other embodiments, the first state identified by the ego vehicle 110 and the second state identified by the remote vehicle 112 describe the set of objects at different times respectively.

In some embodiments, the set of objects identified by the remote vehicle 112 may be identical to the set of objects identified by the ego vehicle 110. In some other embodiments, the set of objects identified by the remote vehicle 112 and the set of objects identified by the ego vehicle 110 may be different from each other and may have one or more overlapping objects.

For example, assume that a total number of objects in a set of objects identified by the remote vehicle 112 is $N_r$ (e.g., $N_r$ is an integer equal to or greater than 1). The remote state data included in the remote V2X message describes the second state of $S_r(t)=[S_{r,1}(t), S_{r,2}(t), \ldots, S_{r,j}(t), \ldots, S_{r,Nr}(t)]$ for the set of objects, where $S_{r,j}(t)$ represents a state of the object j identified by the remote vehicle 112 at a time t and $1 \leq j \leq N_r$. The remote uncertainty data included in the remote V2X message describes the second uncertainty of $U_r(t)=[U_{r,1}(t), U_{r,2}(t), \ldots, U_{r,j}(t), \ldots, U_{r,Nr}(t)]$, where $U_{r,j}(t)$ represents an uncertainty for the state $S_{r,j}(t)$ of the object j at the time t. Here, the subscript "r" in $S_{r,j}(t)$ and $U_{r,j}(t)$ represents the remote vehicle 112 and the subscript "j" in $S_{r,j}(t)$ and $U_{r,j}(t)$ represents the object j. The state $S_{r,j}(t)$ of the object j includes, for example, a position, an object type (e.g., a vehicle, a pedestrian, etc.), a speed, an acceleration, an object size, and a heading angle, etc., of the object j determined by the remote vehicle 112.

In some embodiments, the update module 206 determines uncertainty data describing an uncertainty about the ego object information based at least in part on an analysis of the ego object information relative to the remote object information. For example, the update module 206 determines uncertainty data describing an uncertainty about the ego object information at least by comparing the first state and the first uncertainty identified by the ego vehicle 110 to the second state and the second uncertainty identified by the remote vehicle 112. Here, this uncertainty about the ego object information can be, for example, an uncertainty about the ego object information that is determined based on the first uncertainty and the second uncertainty (e.g., this uncertainty can be an updated version of the first uncertainty that is modified based on the second uncertainty).

For example, the update module 206 updates the ego uncertainty data describing the first uncertainty based on the remote uncertainty data describing the second uncertainty and updates the ego state data describing the first state based on the remote state data describing the second state. Specifically, assume that: (1) the ego state data describes the first state of $S_e(t)=[S_{e,1}(t), S_{e,2}(t), \ldots, S_{e,Ne}(t)]$ and the ego uncertainty data describes the first uncertainty of $U_e(t)=[U_{e,1}(t), U_{e,2}(t), \ldots, U_{e,Ne}(t)]$ for the set of $N_e$ objects identified by the ego vehicle 110; and (2) the remote state data describes the second state of $S_r(t)=[S_{r,1}(t), S_{r,2}(t), \ldots, S_{r,Nr}(t)]$ and the remote uncertainty data describes the second uncertainty of $U_r(t)=[U_{r,1}(t), U_{r,2}(t), \ldots, U_{r,Nr}(t)]$ for the set of $N_r$ objects identified by the remote vehicle 112. As described above, the set of $N_e$ objects and the set of $N_r$ objects can be identical to or different from one another.

For each object j that is included in the set of $N_r$ objects identified by the remote vehicle 112 but not in the set of $N_e$ objects identified by the ego vehicle 110, the update module 206 may perform one or more of the following operations: (1) adding the object j to the set of objects identified by the ego vehicle 110; (2) adding remote state data that describes a state of the object j to the ego state data, or adding the state of the object j detected by the remote vehicle 112 to the first state (e.g., adding the state $S_{r,j}(t)$ of the object j to the first state $S_e(t)$); and (3) adding remote uncertainty data that describes an uncertainty of the object j to the ego uncertainty data, or adding the uncertainty of the object j detected by the remote vehicle 112 to the first uncertainty (e.g., adding the uncertainty $U_{r,j}(t)$ of the object j to the first uncertainty $U_e(t)$). In this case, the set of objects in the ego vehicle 110 is modified to include both the set of $N_e$ objects identified by the ego vehicle 110 and the object j; the first state $S_e(t)$ for the set of objects is modified to include both $[S_{e,1}(t), S_{e,2}(t), \ldots, S_{e,Ne}(t)]$ and the state $S_{r,j}(t)$ of the object j; and the first uncertainty $U_e(t)$ for the set of objects is modified to include both $[U_{e,1}(t), U_{e,2}(t), \ldots, U_{e,Ne}(t)]$ and the uncertainty $U_{r,j}(t)$ of the object j.

On the other hand, for each object j that is included in both the set of $N_r$ objects identified by the remote vehicle 112 and the set of $N_e$ objects identified by the ego vehicle 110, the update module 206 may perform one or more of the following operations: (1) updating ego uncertainty data of the object j based on remote uncertainty data of the object j (e.g., updating the uncertainty $U_{e,j}(t)$ of the object j in the first uncertainty $U_e(t)$ based on the uncertainty $U_{r,j}(t)$ of the object j from the second uncertainty $U_r(t)$); and (2) updating ego state data of the object j based on remote state data of the object j (e.g., updating the state $S_{e,j}(t)$ of the object j in the first state $S_e(t)$ based on the state $S_{r,j}(t)$ of the object j from the second state $S_r(t)$). A first example and a second example are provided below for updating the ego uncertainty data of the object j and the ego state data of the object j based on the remote uncertainty data of the object j and the remote state data of the object j respectively.

In the first example, the update module 206 performs one or more of the following operations to update the ego uncertainty data of the object j and the ego state data of the object j, including: (1) comparing the ego uncertainty data of the object j with the remote uncertainty data of the object j to determine a minimum of the ego uncertainty data of the object j and the remote uncertainty data of the object j (e.g., determining a minimum of the uncertainty $U_{e,j}(t)$ and the uncertainty $U_{r,j}(t)$); (2) updating the ego uncertainty data of the object j with the minimum of the ego uncertainty data of the object j and the remote uncertainty data $U_{r,j}(t)$ of the object j (e.g., replacing the uncertainty $U_{e,j}(t)$ in the first uncertainty $U_e(t)$ with the minimum of the uncertainty $U_{e,j}(t)$ and the uncertainty $U_{r,j}(t)$); and updating ego state data of the object j with state data that corresponds to the minimum of the uncertainty $U_{e,j}(t)$ and the uncertainty $U_{r,j}(t)$ (e.g., if the minimum is the uncertainty $U_{r,j}(t)$ identified by the remote vehicle 112, then the state $S_{e,j}(t)$ of the object j in the first state $S_e(t)$ is replaced by the state $S_{r,j}(t)$ included in the second state $S_r(t)$; however, if the minimum is the uncertainty $U_{e,j}(t)$ identified by the ego vehicle 110, then the state $S_{e,j}(t)$ of the object j in the first state $S_e(t)$ keeps unchanged).

In the second example, the update module 206 performs one or more of the following operations to update the ego uncertainty data of the object j and the ego state data of the object j, including: (1) applying a fusing technique to fuse the ego uncertainty data of the object j with the remote uncertainty data of the object j to determine fused uncertainty data of the object j (e.g., applying the fusing technique to fuse the uncertainty $U_{e,j}(t)$ with the uncertainty $U_{r,j}(t)$ to generate a fused uncertainty of the object j); (2) updating the ego uncertainty data of the object j with the fused uncertainty data (e.g., replacing the uncertainty $U_{e,j}(t)$ of the object j in the first uncertainty $U_e(t)$ with the fused uncertainty of the object j); (3) applying the fusing technique to fuse the ego state data of the object j with the remote state data of the object j to determine fused state data of the object j (e.g., applying the fusing technique to fuse the state $S_{e,j}(t)$ with the state $S_{r,j}(t)$ to generate a fused state of the object j); and (4) updating the ego state data of the object j with the fused state data (e.g., replacing the state $S_{e,j}(t)$ of the object j in the first state $S_e(t)$ with the fused state of the object j). In some embodiments, the fusing technique includes a Kalman filtering technique.

By performing operations similar to those described above for each object j included in the set of objects, the update module 206 updates the ego V2X data that includes (1) the ego state data describing the first state for the set of objects and (2) the ego uncertainty data describing the first uncertainty of the first state. Then, the update module 206 forms updated ego V2X data that describes ego object information that satisfies an uncertainty criterion from the ego V2X data. The updated ego V2X data includes (1) updated ego state data describing an updated state of the set of objects and (2) updated ego uncertainty data describing an uncertainty of the updated state that satisfies the uncertainty criterion. Two example approaches to form the updated ego V2X data based on an uncertainty criterion from the ego V2X data are described below. Other example approaches are also possible.

In each of the two example approaches, the update module 206 determines, from the set of objects, at least a subset of objects that satisfies an uncertainty criterion. The update module 206 generates the updated ego V2X data to include: ego state data of the subset of objects; and ego uncertainty data of the subset of objects. By applying either one of the example approaches described here, ego state data whose accuracy is not sufficiently certain is suppressed and is not broadcast to other vehicles via V2X messages.

In a first example approach, the uncertainty criterion is operable to provide a guarantee to a receiver of the updated ego V2X data that the updated ego V2X data is accurate. Specifically, the update module 206 retrieves threshold data describing an uncertainty threshold. The update module 206 determines at least a part of the ego uncertainty data that satisfies the uncertainty threshold to be the updated ego uncertainty data. The update module 206 determines at least a part of the ego state data that is associated with the updated ego uncertainty data to be the updated ego state data.

For example, the update module 206 determines, from the set of objects, at least a subset of objects whose uncertainty included in the first uncertainty $U_e(t)$ satisfies the uncertainty threshold (e.g., for any object j in the subset of objects, its uncertainty $U_{e,j}(t)$ from the first uncertainty $U_e(t)$ is no greater than the uncertainty threshold). The update module 206 forms (1) the updated ego uncertainty data to include the ego uncertainty data $U_{e,j}(t)$ of each object j in the subset of objects and (2) the updated ego state data to include the ego state data $S_{e,j}(t)$ of each object j in the subset of objects.

In a further example, assume that: (1) the set of objects includes object 1, object 2, object 3 and object 4, with a first uncertainty of $[U_{e,1}(t), U_{e,2}(t), U_{e,3}(t), U_{e,4}(t)]$ and a first state of $[S_{e,1}(t), S_{e,2}(t), S_{e,3}(t), S_{e,4}(t)]$; (2) the ego uncertainty data $U_{e,4}(t)$ of object 4 exceeds the uncertainty threshold; and (3) none of the ego uncertainty data $U_{e,1}(t)$ of object 1, the ego uncertainty data $U_{e,2}(t)$ of object 2 and the ego uncertainty data $U_{e,3}(t)$ of object 3 exceeds the uncertainty threshold. In this case, the update module 206 determines that the subset of objects includes object 1, object 2 and object 3. Then, the updated ego uncertainty data formed by the update module 206 includes the ego uncertainty data $U_{e,1}(t)$ of object 1, the ego uncertainty data $U_{e,2}(t)$ of object 2 and the ego uncertainty data $U_{e,3}(t)$ of object 3, and describes an uncertainty of $[U_{e,1}(t), U_{e,2}(t), U_{e,3}(t)]$. The updated ego state data formed by the update module 206 includes the ego state data $S_{e,1}(t)$ of object 1, the ego state data $S_{e,2}(t)$ of object 2 and the ego state data $S_{e,3}(t)$ of object 3, and describes an updated state of $[S_{e,1}(t), S_{e,2}(t), S_{e,3}(t)]$.

In a second example approach, the formation of the updated ego V2X data includes applying the uncertainty criterion as an information suppressing technique that is operable to prevent redundant ego object information from being transmitted to potential receivers so that a load of a network that transmits the updated ego V2X data is reduced. For example, this second example approach includes suppression of redundant V2X data so that the redundant V2X data is not transmitted to other vehicles in the roadway environment.

A basic policy here includes that: the ego vehicle 110 incorporates a state and uncertainty measurement $m_{e,j}=(S_{e,j}, U_{e,j})$ of a road object j into an ego V2X message to be transmitted to other potential receivers if there may be any potential receiver k whose uncertainty about the state of the object j does not satisfy the uncertainty threshold. That is, if any potential receiver k has an uncertainty about the state of the object j that is more than the uncertainty threshold, the object j is incorporated into the subset of objects described above by the ego vehicle 110, and corresponding ego state data and corresponding ego uncertainty data of the object j is to be transmitted to other vehicles. A method 600 for determining the subset of objects based on the uncertainty criterion in the second example approach is described below in more detail with reference to FIGS. 6A-6B.

This uncertainty about the state of the object j is estimated from the potential receiver k's point of view based on the ego vehicle's recent observation of V2X messages coming from the potential receiver k under assumptions that: (1) the potential receiver k may not have received V2X messages that the ego vehicle 110 has received; and (2) the potential receiver k may have received V2X messages that the ego vehicle 110 does not receive. This uncertainty about the state of the object j estimated from the potential receiver k's point of view may be referred to as a "receiver uncertainty" about the state of the object j and represents as $R_{k,j}(t)$ to be distinguished from the ego uncertainty data $U_{e,j}(t)$ of the object j described above.

For example, the update module 206 simulates a receiver uncertainty $R_{k,j}(t)$ of the object j from the point of view of the potential receiver k with the following inputs: (1) at least part of or all the V2X messages that the ego vehicle 110 receives from the potential receiver k; and (2) one of last M measurements about the object j that (i) the ego vehicle 110 includes in its own V2X messages or (ii) the ego vehicle 110 receives from any other potential receivers except for the potential receiver k over a recent time window of W (e.g., this second input is based on an assumption that the potential receiver k receives only a subset of V2X messages that the ego vehicle 110 receives due to constraints of a communication range or other factors). For example, each of the last M measurements about the object j may include a state measurement and an uncertainty measurement of the object j. The second example approach is described below in more detail with references to FIGS. 6A-7.

An example benefit of applying the second example approach includes that it does not incorporate redundant object information that other receivers don't need into the updated ego V2X data that is to be transmitted to the other receivers. For example, if all the other receivers already have an accurate measurement of the object information, the ego vehicle 110 does not need to transmit this object information to the other vehicles any more even if this object information in the ego vehicle 110 is more accurate. In this way, redundant object information can be suppressed from transmission and a network load can be reduced.

The generation module 208 can be software including routines that, when executed by the processor 125, cause the processor 125 to generate an ego V2X message. In some embodiments, the generation module 208 can be a set of instructions stored in the memory 127 of the computer system 200 and can be accessible and executable by the processor 125. The generation module 208 may be adapted for cooperation and communication with the processor 125 and other components of the computer system 200 via a signal line 228.

In some embodiments, the generation module 208 is operable to generate an ego V2X message including the updated ego V2X data that satisfies the uncertainty criterion. The generation module 208 instructs the operation module 210 to transmit the ego V2X message via the communication unit 145 so that a receiver of the ego V2X message only receives the updated ego V2X data that is sufficiently certain to satisfy the uncertainty criterion and the receiver has reduced uncertainty about the ego object information.

The operation module 210 can be software including routines that, when executed by the processor 125, cause the processor 125 to modify an operation of the ego vehicle 110. In some embodiments, the operation module 210 can be a set of instructions stored in the memory 127 of the computer system 200 and can be accessible and executable by the processor 125. The operation module 210 may be adapted for cooperation and communication with the processor 125 and other components of the computer system 200 via a signal line 229.

In some embodiments, the operation module 210 is operable to modify an operation of the communication unit 145 of the ego vehicle 110 to receive a remote V2X message that includes the remote V2X data from the remote vehicle 112. For example, the operation module 210 modifies one or more operation elements of the communication unit 145 to receive the remote V2X message via the communication unit 145.

In some embodiments, the operation module 210 is operable to modify an operation of the communication unit 145 of the ego vehicle 110 to transmit an ego V2X message that includes updated ego V2X data to one or more receivers. For example, the operation module 210 modifies one or more operation elements of the communication unit 145 to transmit the ego V2X message via the communication unit 145.

In some embodiments, the one or more operation elements of the communication unit 145 includes one or more of the following: one or more active V2X channels to be operated on the communication unit 145; one or more active V2X radios to be operated on the communication unit 145; one or more active V2X antennas to be operated on the communication unit 145; one or more operating frequencies of the one or more active V2X channels; one or more beamforming techniques performed on the one or more active V2X antennas; and a bandwidth allocation scheme of the communication unit 145.

For example, when receiving the remote V2X message or transmitting the ego V2X message, the operation module 210 can modify one or more of the following operation elements of the communication unit 145: (1) increasing the number of active V2X channels so that more V2X channels can be used to communicate with other nearby vehicles simultaneously; (2) changing a beamforming technique applied on one or more V2X antennas so that a signal transmitted to a nearby vehicle with a farther distance may have a higher signal strength; and (3) allocating more bandwidth to the communication unit 145 so that data can be exchanged with other nearby vehicles with a faster speed. In this way, communication efficiency of the ego vehicle 110 can be improved.

In some embodiments, the operation module 210 modifies an operation of the vehicle control system 158 of the ego vehicle 110 to improve performance of the ego vehicle 110 based on the ego state data that is updated based on the remote state data. For example, the vehicle control system 158 of the ego vehicle 110 includes the ADAS system 159, and the ego state data that is updated based on the remote state data causes a modification to an operation of the ADAS system 159 so that driving safety or driving experience of the ego vehicle 110 is improved (e.g., the ego state data that is updated based on the remote state data has a more accurate measurement of positions of other objects on the roadway so that the ADAS system 159 can control a brake system or an acceleration system of the ego vehicle 110 to avoid potential collisions).

In another example, the vehicle control system 158 of the ego vehicle 110 includes the autonomous driving system 160, and the ego state data that is updated based on the remote state data causes a modification to an operation of the autonomous driving system 160 so that driving safety or driving experience of the ego vehicle 110 is improved (e.g., the ego state data that is updated based on the remote state data has a more accurate measurement of positions of other objects on the roadway so that the autonomous driving system 160 can plan self-driving schemes in advance such as informing a driver of a lane change, an acceleration or a deceleration in advance, etc.).

Example Processes

Figure 3:
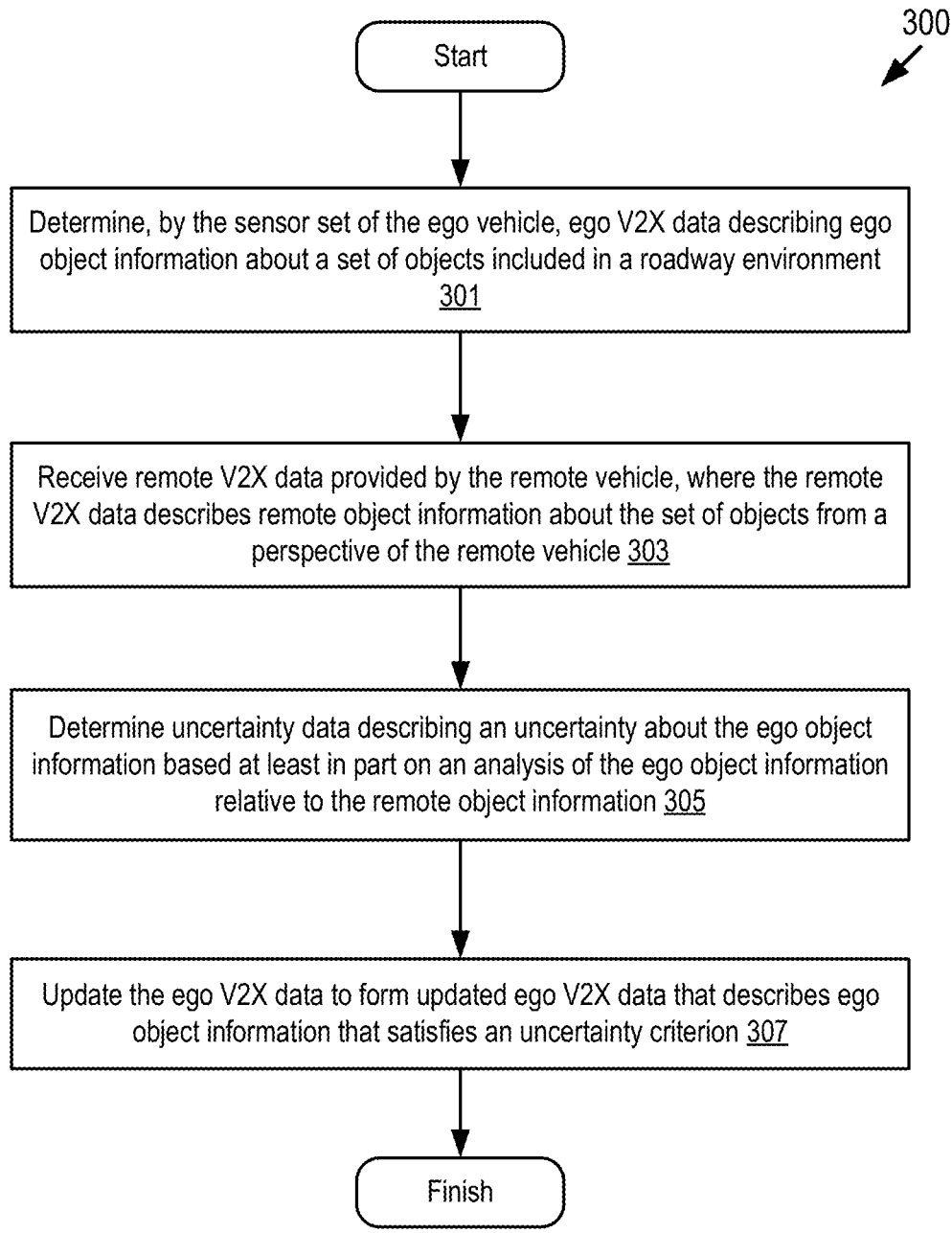
FIG. 3 depicts a method for selecting V2X data to be shared among vehicles in a cooperative vehicular system based on an uncertainty criterion according to some embodiments.

Referring now to FIG. 3, depicted is a flowchart of an example method 300 for selecting V2X data to be shared among vehicles in a cooperative vehicular system based on an uncertainty criterion according to some embodiments. The steps of the method 300 are executable in any order, and not necessarily the order depicted in FIG. 3.

At step 301, the determination module 204 determines, via the sensor set 154 of the ego vehicle 110, ego V2X data describing ego object information about a set of objects included in a roadway environment.

At step 303, the update module 206 receives remote V2X data provided by the remote vehicle 112, where the remote V2X data describes remote object information about the set of objects from a perspective of the remote vehicle 112.

At step 305, the update module 206 determines uncertainty data describing an uncertainty about the ego object information based at least in part on an analysis of the ego object information relative to the remote object information.

At step 307, the update module 206 updates the ego V2X data to form updated ego V2X data that describes ego object information that satisfies an uncertainty criterion.

Figure 4A:
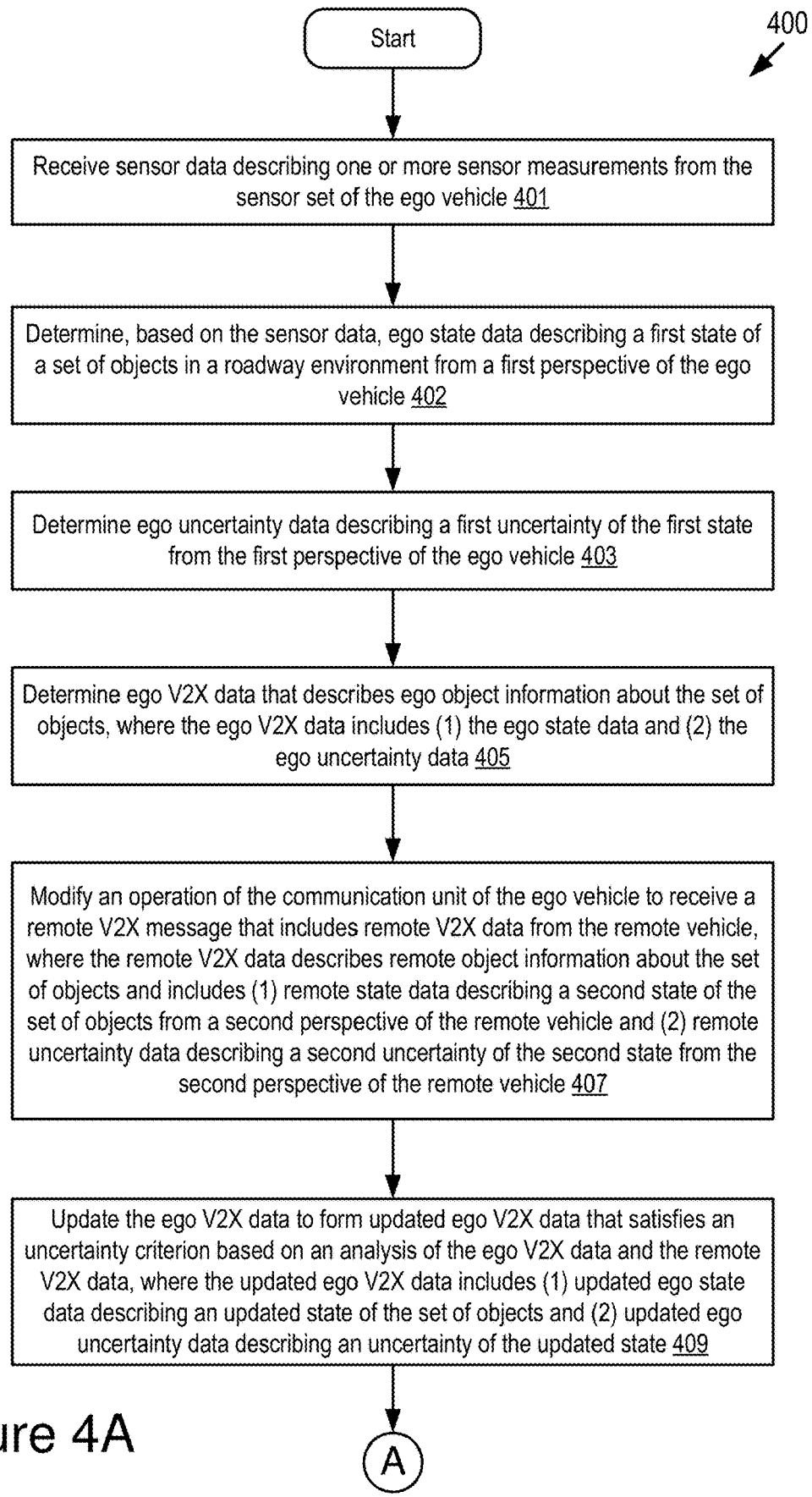
FIGS. 4A-4B depict another method for selecting V2X data to be shared among vehicles in a cooperative vehicular system based on an uncertainty criterion according to some embodiments.
Figure 4B:
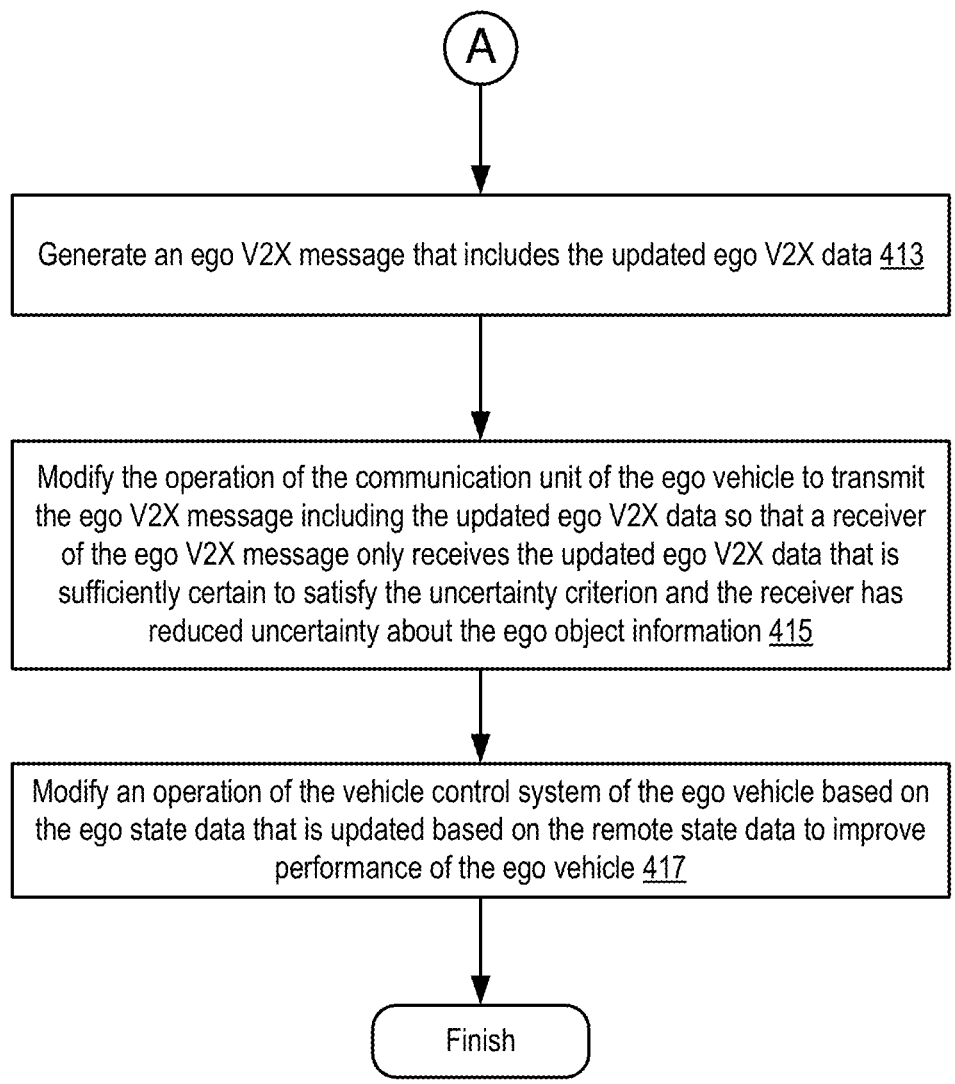

FIGS. 4A-4B depict another method 400 for selecting V2X data to be shared among vehicles in a cooperative vehicular system based on an uncertainty criterion according to some embodiments. The steps of the method 400 are executable in any order, and not necessarily the order depicted in FIGS. 4A-4B.

Referring to FIG. 4A, at step 401, the determination module 204 receives sensor data describing one or more sensor measurements from the sensor set 154 of the ego vehicle 110.

At step 402, the determination module 204 determines, based on the sensor data, ego state data describing a first state of a set of objects in a roadway environment from a first perspective of the ego vehicle 110.

At step 403, the determination module 204 determines ego uncertainty data describing a first uncertainty of the first state from the first perspective of the ego vehicle 110.

At step 405, the determination module 204 determines ego V2X data that describes ego object information about the set of objects, where the ego V2X data includes (1) the ego state data and (2) the ego uncertainty data.

At step 407, the operation module 210 modifies an operation of the communication unit 145 of the ego vehicle 110 to receive a remote V2X message that includes remote V2X data from the remote vehicle 112, where the remote V2X data describes remote object information about the set of objects and includes (1) remote state data describing a second state of the set of objects from a second perspective of the remote vehicle 112 and (2) remote uncertainty data describing a second uncertainty of the second state from the second perspective of the remote vehicle 112.

At step 409, the update module 206 updates the ego V2X data to form updated ego V2X data that satisfies an uncertainty criterion based on an analysis of the ego V2X data and the remote V2X data, where the updated ego V2X data includes (1) updated ego state data describing an updated state of the set of objects and (2) updated ego uncertainty data describing an uncertainty of the updated state.

Referring to FIG. 4B, at step 413, the generation module 208 generates an ego V2X message that includes the updated ego V2X data.

At step 415, the operation module 210 modifies the operation of the communication unit 145 of the ego vehicle 110 to transmit the ego V2X message including the updated ego V2X data so that a receiver of the ego V2X message only receives the updated ego V2X data that is sufficiently certain to satisfy the uncertainty criterion and the receiver has reduced uncertainty about the ego object information.

At step 417, the operation module 210 modifies an operation of the vehicle control system 158 of the ego vehicle 110 based on the ego state data that is updated based on the remote state data so that performance of the ego vehicle 110 is improved.

Figure 5A:
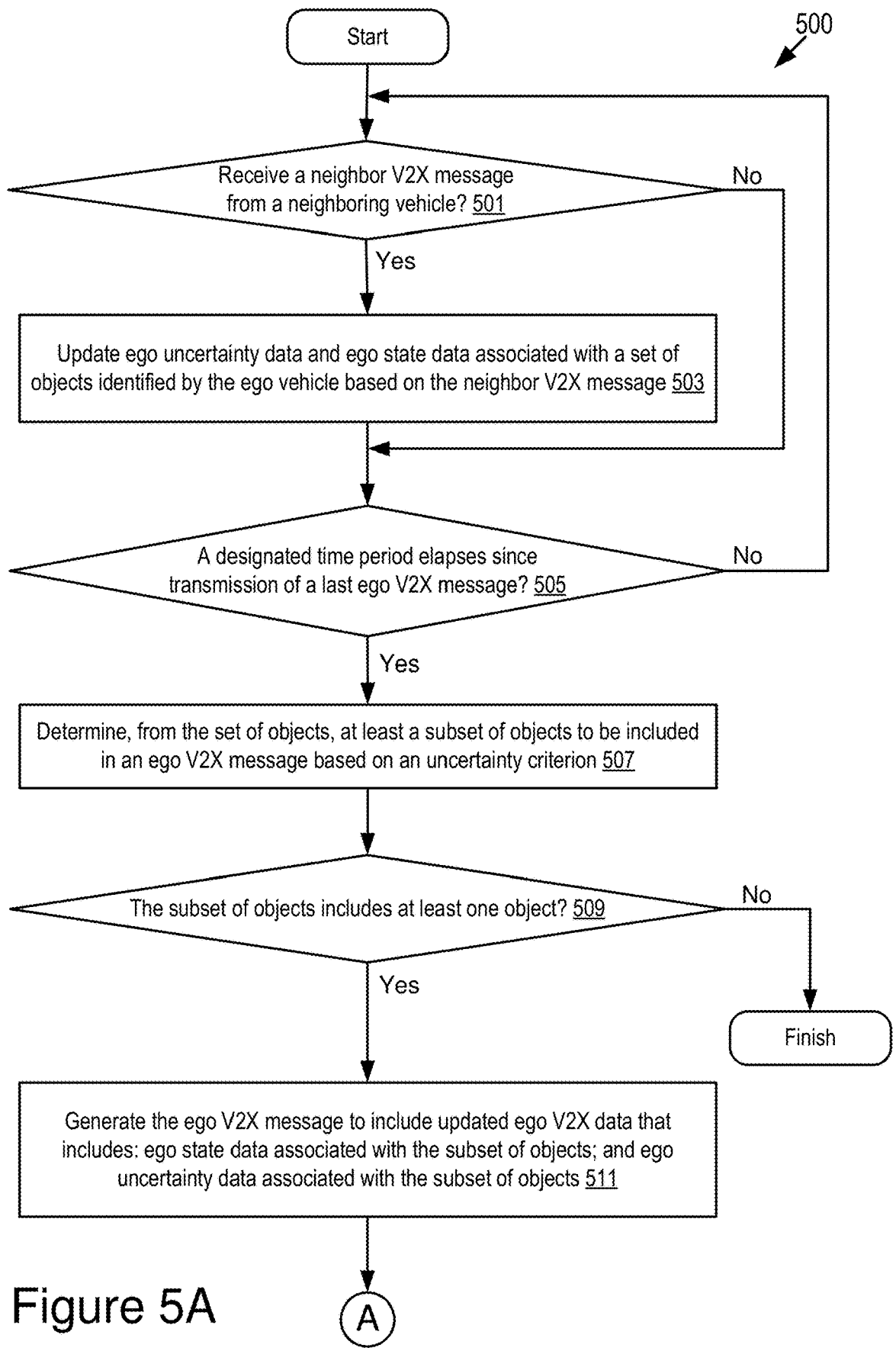
FIGS. 5A-5B depict yet another method for selecting V2X data to be shared among vehicles in a cooperative vehicular system based on an uncertainty criterion according to some embodiments.
Figure 5B:
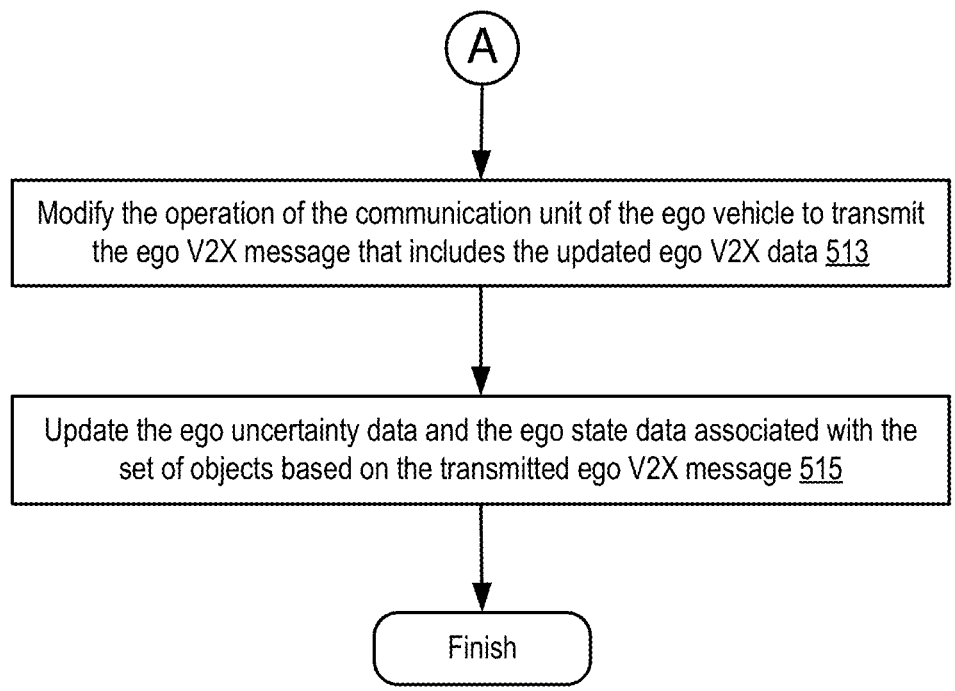

FIGS. 5A-5B depict yet another method 500 for selecting V2X data to be shared among vehicles in a cooperative vehicular system based on an uncertainty criterion according to some embodiments. The steps of the method 500 are executable in any order, and not necessarily the order depicted in FIGS. 5A-5B.

Referring to FIG. 5A, at step 501, the determination module 204 determines whether the ego vehicle 110 receives a neighbor V2X message from a neighboring vehicle. For example, the neighboring vehicle can be the remote vehicle 112 and the neighbor V2X message is a remote V2X message. In another example, the neighboring vehicle can be any other vehicle in the vicinity of the ego vehicle 110. Responsive to receiving the neighbor V2X message from the neighboring vehicle, the method 500 moves to step 503. Otherwise, the method 50 moves to step 505.

At step 503, the update module 206 updates ego uncertainty data and ego state data associated with a set of objects identified by the ego vehicle 110 based on the neighbor V2X message.

At step 505, the update module 206 determines whether a designated time period T elapses since a transmission of a last ego V2X message. Responsive to determining that the designated time period T elapses, the method 500 moves to step 507. Otherwise, the method 500 moves back to step 501. In some embodiments, the designated time period T can be dynamically adjusted by a decentralized congestion control.

At step 507, the update module 206 determines, from the set of objects, at least a subset of objects to be included in an ego V2X message based on an uncertainty criterion. For example, the update module 206 may perform operations similar to those described below with reference to FIGS. 6A-6B to determine the subset of objects to be included in the ego V2X message.

At step 509, the update module 206 determines whether the subset of objects includes at least one object. Responsive to determining that the subset of objects includes at least one object, the method 500 moves to step 511. Otherwise, the method 500 ends.

At step 511, the update module 206 generates the ego V2X message to include updated ego V2X data that includes: ego state data associated with the subset of objects; and ego uncertainty data associated with the subset of objects. For example, the ego state data associated with the subset of objects may include ego state data $S_{e,j}(t)$ of each object j included in the subset of objects, and the ego uncertainty data associated with the subset of objects may include ego uncertainty data $U_{e,j}(t)$ of each object j included in the subset of objects.

Referring to FIG. 5B, at step 513, the operation module 210 modifies the operation of the communication unit 145 of the ego vehicle 110 to transmit the ego V2X message that includes the updated ego V2X data.

At step 515, the update module 206 updates the ego uncertainty data of the set of objects and the ego state data of the set of objects based on the transmitted ego V2X message.

Figure 6A:
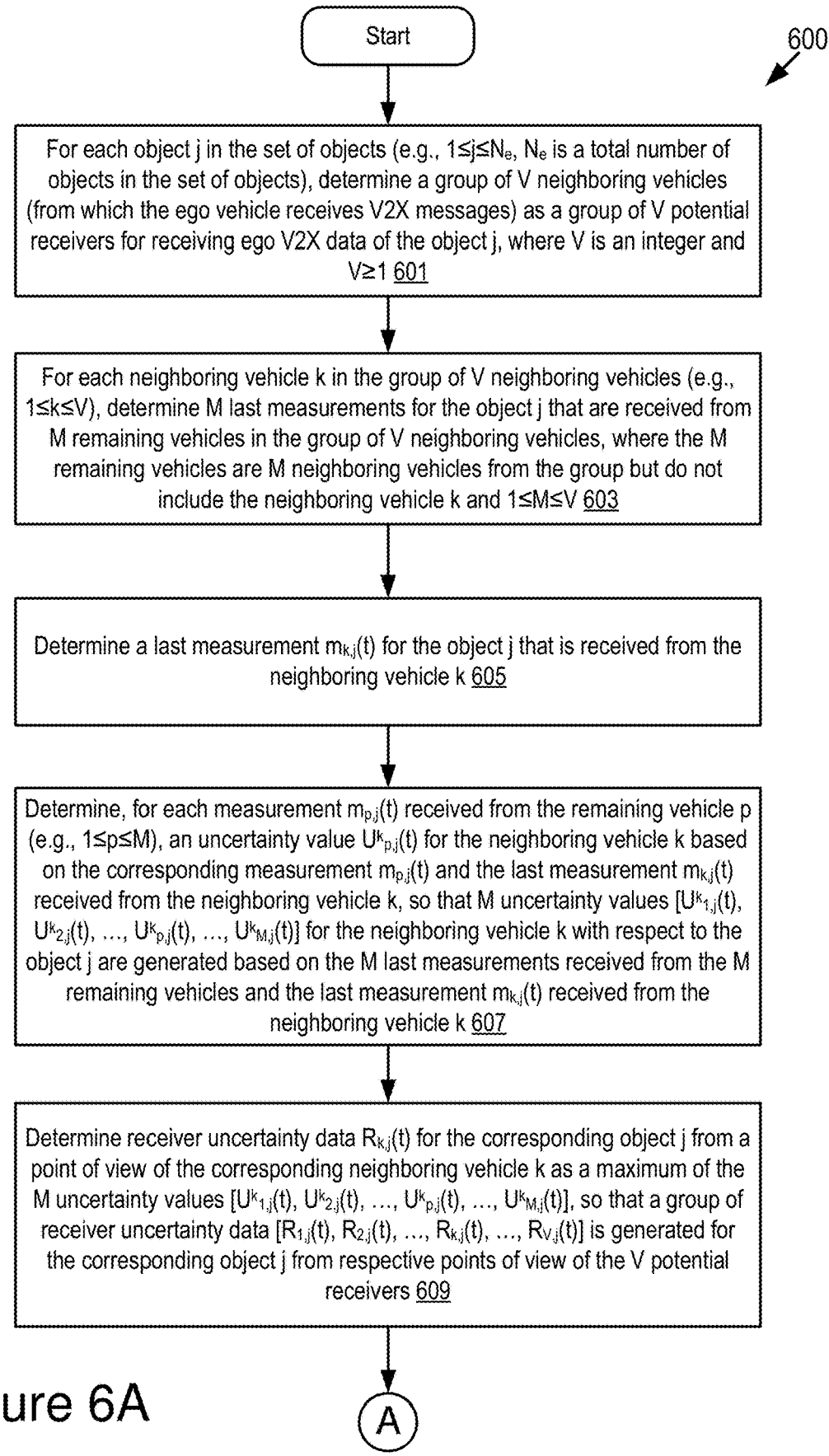
FIGS. 6A-6B depict a method for determining, from a set of objects, a subset of objects to be included in an ego V2X message based on an uncertainty criterion according to some embodiments.
Figure 6B:
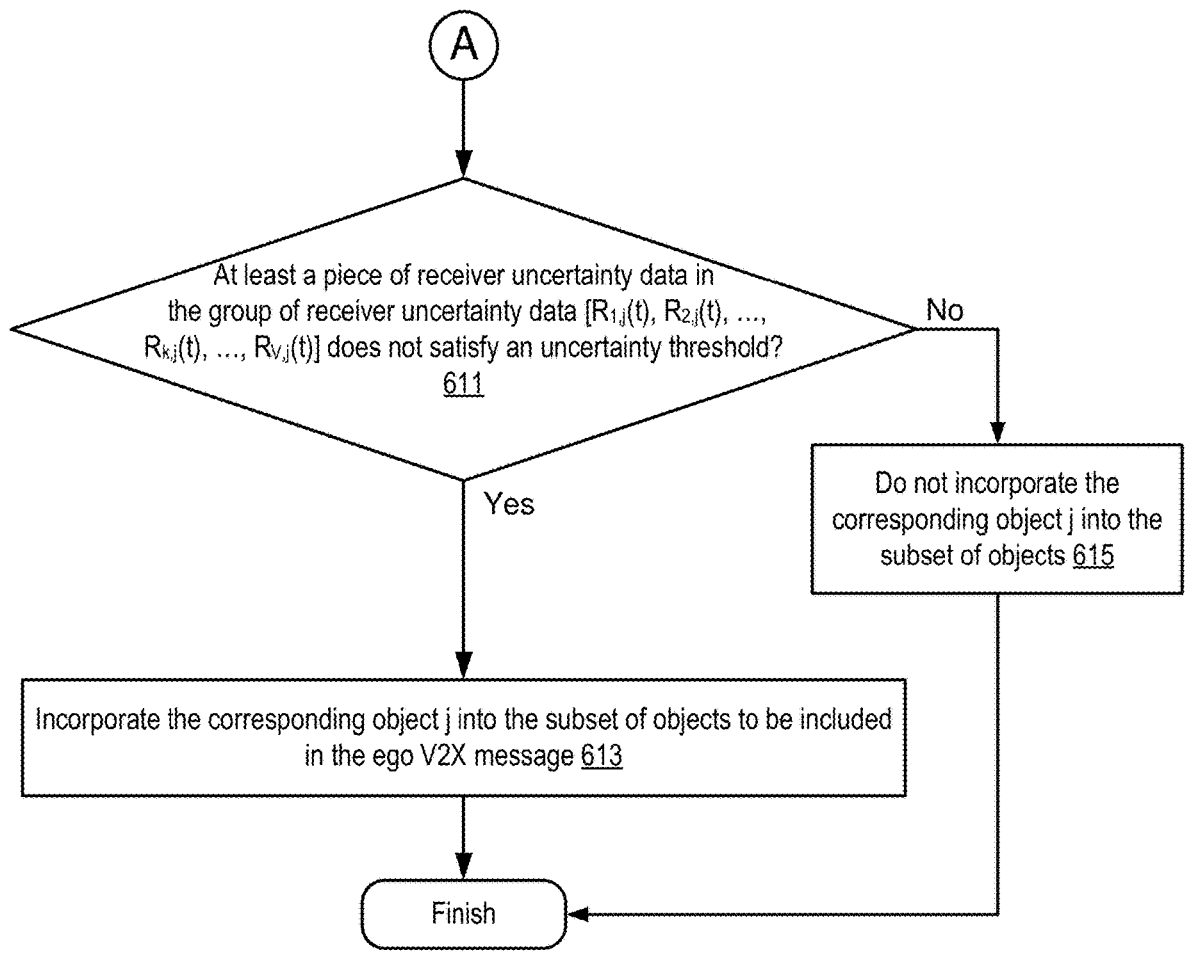

FIGS. 6A-6B depict a method 600 for determining, from a set of objects, a subset of objects whose ego object information is to be included in an ego V2X message for transmission based on an uncertainty criterion according to some embodiments. The steps of the method 600 are executable in any order, and not necessarily the order depicted in FIGS. 6A-6B.

At step 601, for each object j in the set of objects (e.g., $1 \leq j \leq N_e$, $N_e$ is a total number of objects in the set of objects), the update module 206 determines a group of V neighboring vehicles (from which the ego vehicle 110 receives V2X messages) as a group of V potential receivers for receiving ego V2X data of the object j, where V is an integer and $V \geq 1$.

At step 603, for each neighboring vehicle k in the group of V neighboring vehicles (e.g., $1 \leq k \leq V$), the update module 206 determines M last measurements for the object j that are received from M remaining vehicles in the group of V neighboring vehicles, where the M remaining vehicles are M neighboring vehicles from the group but do not include the neighboring vehicle k and $1 \leq M \leq V$. For example, each measurement $m_{p,j}(t)$ for the object j received from a corresponding remaining vehicle p (e.g., $1 \leq p \leq M$) includes a state $S_{p,j}(t)$ of the object j and an uncertainty $U_{p,j}(t)$ for the state $S_{p,j}(t)$ of the object j identified by the remaining vehicle p (e.g., $m_{p,j}(t)=[S_{p,j}(t), U_{p,j}(t)]$). The M last measurements include $[m_{1,j}(t), m_{2,j}(t), \ldots, m_{p,j}(t), \ldots, m_{M,j}(t)]$ that are received from the M remaining vehicles respectively.

At step 605, the update module 206 determines a last measurement $m_{k,j}(t)$ for the object j that is received from the neighboring vehicle k. For example, the last measurement $m_{k,j}(t)$ received from the neighboring vehicle k includes a state $S_{k,j}(t)$ of the object j and an uncertainty $U_{k,j}(t)$ for the state $S_{k,j}(t)$ of the object j identified by the neighboring vehicle k (e.g., $m_{k,j}(t)=[S_{k,j}(t), U_{k,j}(t)]$).

At step 607, the update module 206 determines, for each measurement $m_{p,j}(t)$ received from the remaining vehicle p (e.g., $1 \leq p \leq M$), an uncertainty value $U^k_{p,j}(t)$ for the neighboring vehicle k based on the corresponding measurement $m_{p,j}(t)$ and the last measurement $m_{k,j}(t)$ received from the neighboring vehicle k. For example, the uncertainty value $U^k_{p,j}(t)$ is a minimum of (1) the uncertainty $U_{k,j}(t)$ of the object j identified by the neighboring vehicle k and (2) the uncertainty $U_{p,j}(t)$ of the object j identified by the remaining vehicle p (e.g., $U^k_{p,j}(t)$=a minimum of $U_{k,j}(t)$ and $U_{p,j}(t)$). In another example, the uncertainty value $U^k_{p,j}(t)$ is a maximum of (1) the uncertainty $U_{k,j}(t)$ of the object j identified by the neighboring vehicle k and (2) the uncertainty $U_{p,j}(t)$ of the object j identified by the remaining vehicle p (e.g., $U^k_{p,j}(t)$=a maximum of $U_{k,j}(t)$ and $U_{p,j}(t)$). In yet another example, the uncertainty value $U^k_{p,j}(t)$ is a fused uncertainty value of (1) the uncertainty $U_{k,j}(t)$ of the object j identified by the neighboring vehicle k and (2) the uncertainty $U_{p,j}(t)$ of the object j identified by the remaining vehicle p (e.g., $U^k_{p,j}(t)$=a fused value of $U_{k,j}(t)$ and $U_{p,j}(t)$). Here, the fused uncertainty value can be obtained by applying a fusing technique (e.g., a Kalman filtering technique) based on the (1) the uncertainty $U_{k,j}(t)$ of the object j identified by the neighboring vehicle k and (2) the uncertainty $U_{p,j}(t)$ of the object j identified by the remaining vehicle p.

By performing operations similar to those described above in the preceding paragraph, M uncertainty values $[U^k_{1,j}(t), U^k_{2,j}(t), \ldots, U^k_{p,j}(t), \ldots, U^k_{M,j}(t)]$ for the neighboring vehicle k with respect to the object j are generated based on the M last measurements received from the M remaining vehicles and the last measurement $m_{k,j}(t)$ received from the neighboring vehicle k.

At step 609, the update module 206 determines receiver uncertainty data $R_{k,j}(t)$ for the corresponding object j from a point of view of the neighboring vehicle k as a maximum of the M uncertainty values $[U^k_{1,j}(t), U^k_{2,j}(t), \ldots, U^k_{p,j}(t), \ldots, U^k_{M,j}(t)]$ (e.g., $R_{k,j}(t)$=a maximum of $[U^k_{1,j}(t), U^k_{2,j}(t), \ldots, U^k_{p,j}(t), \ldots, U^k_{M,j}(t)]$).

By performing operations similar to those described above, a group of receiver uncertainty data $[R_{1,j}(t), R_{2,j}(t), \ldots, R_{k,j}(t), \ldots, R_{V,j}(t)]$ is generated for the corresponding object j from points of view of the V potential receivers respectively.

Referring to FIG. 6B, the update module 206 determines whether there is at least a piece of receiver uncertainty data in the group of receiver uncertainty data $[R_{1,j}(t), R_{2,j}(t), \ldots, R_{k,j}(t), \ldots, R_{V,j}(t)]$ does not satisfy the uncertainty threshold. Responsive to determining that at least a piece of receiver uncertainty data does not satisfy the uncertainty threshold (e.g., $R_{1,j}(t)$ is greater than the uncertainty threshold), the method 600 moves to step 613. Responsive to determining that each of the receiver uncertainty data satisfies the uncertainty threshold (e.g., each of the receiver uncertainty data $[R_{1,j}(t), R_{2,j}(t), \ldots, R_{k,j}(t), \ldots, R_{V,j}(t)]$ is not greater than the uncertainty threshold), the method 600 moves to step 615.

At step 613, the update module 206 incorporates the corresponding object j into the subset of objects to be included in the ego V2X message.

At step 615, the update module 206 does not incorporate the corresponding object j into the subset of objects.

By performing steps 601-615 described above for each object j in the set of objects, the update module 206 can determine the subset of objects whose ego object information is to be included in the ego V2X message for transmission. After determining the subset of objects, the update module 206 can form updated ego V2X data that includes (1) updated ego state data (including ego state data of the subset of objects) and (2) updated ego uncertainty data (including ego uncertainty data of the subset of objects). Then, the generation module 208 generates the ego V2X message to include the updated ego V2X data and causes the operation module 210 to transmit the ego V2X message via the communication unit 145 of the ego vehicle 110.

Figure 7:
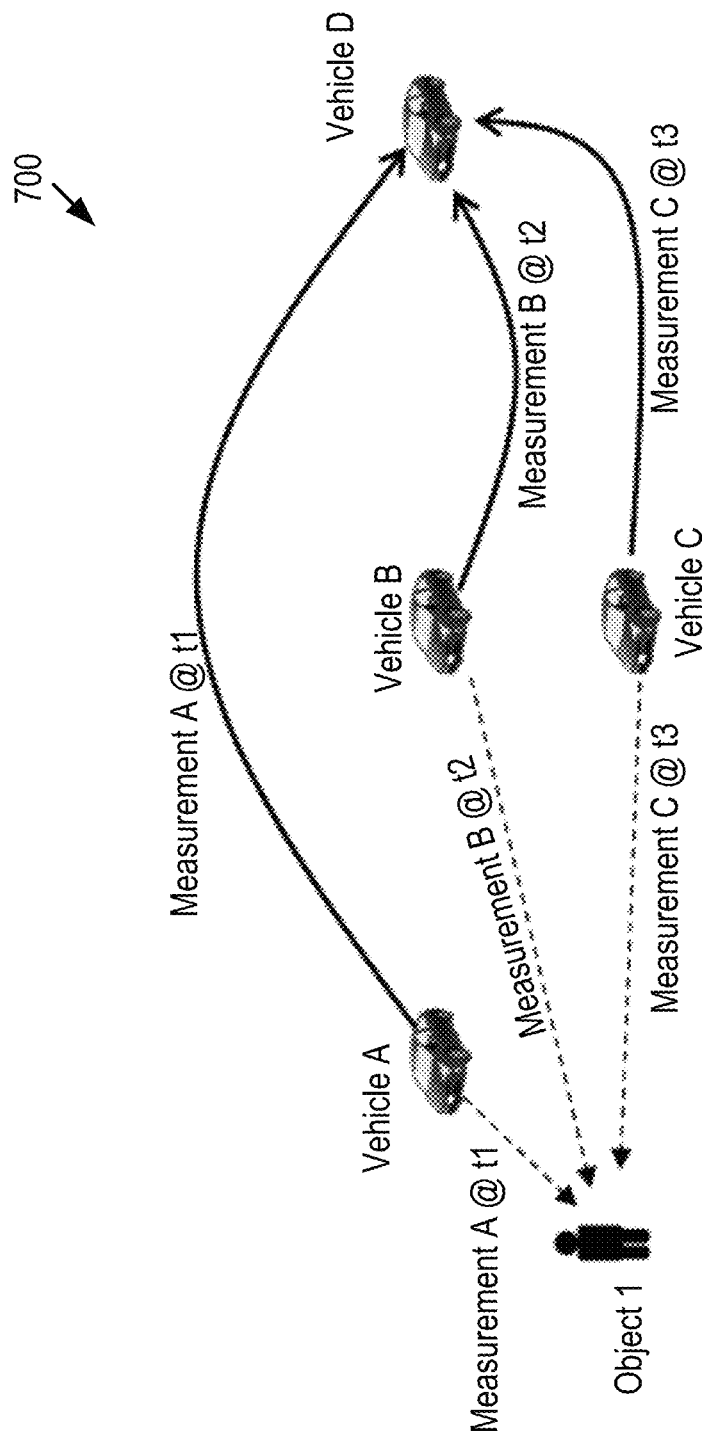
FIG. 7 is a graphic representation illustrating an example use case for determining object information to be included in an ego V2X message based on an uncertainty criterion according to some embodiments.

FIG. 7 is a graphic representation illustrating an example use case 700 for determining object information to be included in an ego V2X message based on an uncertainty criterion according to some embodiments. In the example use case 700, there is one object (e.g., object 1) and 4 vehicles (e.g., vehicle A, vehicle B, vehicle C and vehicle D) in a roadway environment. The vehicle A detects object 1 and generates a measurement $m_{A,1}(t1)$ for object 1 at a time t1 (e.g., measurement A@t1), where the measurement $m_{A,1}(t1)$ includes a state $S_{A,1}(t1)$ of object 1 and an uncertainty $U_{A,1}(t1)$ for the state $S_{A,1}(t1)$ of object 1 identified by the vehicle A (e.g., $m_{A,1}(t1)=[S_{A,1}(t1), U_{A,1}(t1)]$).

Similarly, the vehicle B detects object 1 and generates a measurement $m_{B,1}(t2)$ for object 1 at a time t2 (e.g., measurement B@t2), where the measurement $m_{B,1}(t2)$ includes a state $S_{B,1}(t2)$ of object 1 and an uncertainty $U_{B,1}(t2)$ for the state $S_{B,1}(t2)$ of object 1 identified by the vehicle B (e.g., $m_{B,1}(t2)=[S_{B,1}(t2), U_{B,1}(t2)]$). The vehicle C detects object 1 and generates a measurement $m_{C,1}(t3)$ for object 1 at a time t3 (e.g., measurement C@t3), where the measurement $m_{C,1}(t3)$ includes a state $S_{C,1}(t3)$ of object 1 and an uncertainty $U_{C,1}(t3)$ for the state $S_{C,1}(t3)$ of object 1 identified by the vehicle C (e.g., $m_{C,1}(t3)=[S_{C,1}(t3), U_{C,1}(t3)]$).

Assume that: (1) the vehicle D receives the vehicle A's measurement $m_{A,1}(t1)$ about object 1 from the vehicle A at the time t1 (e.g., obviously, this measurement is available at the vehicle A; (2) the vehicle D receives the vehicle B's measurement $m_{B,1}(t2)$ about object 1 from the vehicle B at the time t2 (e.g., this measurement may or may not be received by the vehicle A); and (3) the vehicle D receives the vehicle C's measurement $m_{C,1}(t3)$ about object 1 from the vehicle C at the time t3 (e.g., this measurement may or may not be received by the vehicle A).

With respect to the vehicle A, the vehicle D estimates a receiver uncertainty $R_{A,1}(t)$ for object 1 from a point of view of the vehicle A by considering the following two scenarios: (i) a first scenario including that the measurement $m_{A,1}(t1)$ and the vehicle B's measurement $m_{B,1}(t2)$ are available at the vehicle A; and (ii) a second scenario including that the measurement $m_{A,1}(t1)$ and the vehicle C's measurement $m_{C,1}(t3)$ are available at the vehicle A.

With combined reference to FIGS. 6A-6B described above, the example use case 700 is a case when: (1) the set of objects includes object 1; (2) the group of V potential receivers includes 3 neighboring vehicles (e.g., V=3, the vehicles A, B and C are 3 neighboring vehicles of the vehicle D); (3) besides the vehicle A's own measurement, there are 2 other measurements (e.g., M=2) available from two remaining vehicles (e.g., the vehicle B and the vehicle C are remaining vehicles; and besides the vehicle A's own measurement $m_{A,1}(t1)$, the vehicle B's measurement $m_{B,1}(t2)$ and the vehicle C's measurement $m_{C,1}(t3)$ are also available).

Next, the update module 206 of the vehicle D determines, for the measurement $m_{B,1}(t2)=[S_{B,1}(t2), U_{B,1}(t2)]$ received from the first remaining vehicle B, an uncertainty value $U^A_{B,1}(t)$ for object 1 with respect to the vehicle A based on the corresponding measurement $m_{B,1}(t2)$ and the measurement $m_{A,1}(t1)=[S_{A,1}(t1), U_{A,1}(t1)]$ received from the vehicle A. For example, the uncertainty value $U^A_{B,1}(t)$ is a minimum of $U_{B,1}(t2)$ and $U_{A,1}(t1)$. In another example, the uncertainty value $U^A_{B,1}(t)$ is a maximum of $U_{B,1}(t2)$ and $U_{A,1}(t1)$. In yet another example, the uncertainty value $U^A_{B,1}(t)$ is a fused value of $U_{B,1}(t2)$ and $U_{A,1}(t1)$. This uncertainty value $U^A_{B,1}(t)$ corresponds to the first scenario described above.

By performing similar operations, the update module 206 of the vehicle D determines, for the measurement $m_{C,1}(t3)=[S_{C,1}(t3), U_{C,1}(t3)]$ received from the second remaining vehicle C, an uncertainty value $U^A_{C,1}(t)$ for object 1 with respect to the vehicle A based on the corresponding measurement $m_{C,1}(t3)$ and the measurement $m_{A,1}(t1)=[S_{A,1}(t1), U_{A,1}(t1)]$ received from the vehicle A. This uncertainty value $U^A_{C,1}(t)$ corresponds to the second scenario described above.

In this way, 2 uncertainty values $[U^A_{B,1}(t), U^A_{C,1}(t)]$ for object 1 with respect to the vehicle A are generated based on the 2 measurements $m_{B,1}(t2)$ and $m_{C,1}(t3)$ received from the two remaining vehicles (e.g., the vehicle B and vehicle C) and the measurement $m_{A,1}(t1)$ received from the vehicle A.

The update module 206 of the vehicle D determines a receiver uncertainty $R_{A,1}(t)$ for object 1 from a point of view of the vehicle A as a maximum of the 2 uncertainty values $[U^A_{B,1}(t), U^A_{C,1}(t)]$.

By performing similar operations, the update module 206 of the vehicle D can determine a receiver uncertainty $R_{B,1}(t)$ for object 1 from a point of view of the vehicle B and a receiver uncertainty $R_{C,1}(t)$ for object 1 from a point of view of the vehicle C.

In this way, a group of receiver uncertainty data $[R_{A,1}(t), R_{B,1}(t), R_{C,1}(t)]$ is generated for object 1 from respective points of view of the 3 neighboring vehicles A, B and C.

Next, the update module 206 of the vehicle D determines whether there is at least a piece of receiver uncertainty data in the group of receiver uncertainty data $[R_{A,1}(t), R_{B,1}(t), R_{C,1}(t)]$ does not satisfy the uncertainty threshold. Responsive to determining that at least a piece of receiver uncertainty data does not satisfy the uncertainty threshold (e.g., $R_{A,1}(t)$ is greater than the uncertainty threshold), the update module 206 of the vehicle D incorporates V2X data (e.g., state data and uncertainty data) of object 1 into a V2X message to be transmitted. Responsive to determining that each of the receiver uncertainty data satisfies the uncertainty threshold (e.g., each of the receiver uncertainty data $[R_{A,1}(t), R_{B,1}(t), R_{C,1}(t)]$ is no greater than the uncertainty threshold), the update module 206 of the vehicle D does not incorporate the V2X data of object 1 into the V2X message to be transmitted.

Figure 8:
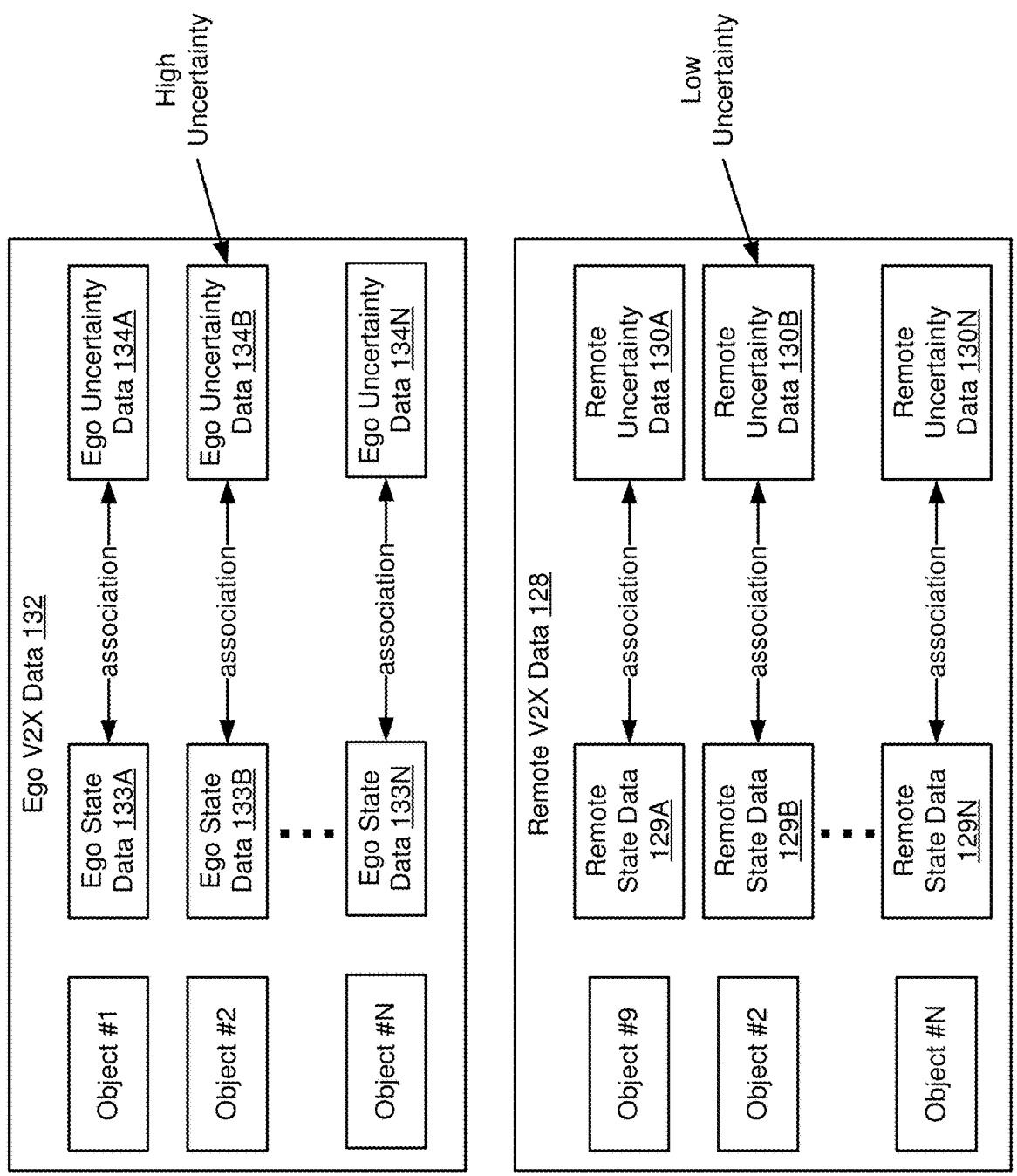
FIG. 8 is a graphic representation illustrating example ego V2X data and example remote V2X data according to some embodiments.

FIG. 8 is a graphic representation 800 illustrating example ego V2X data 132 and example remote V2X data 128 according to some embodiments. The example ego V2X data 132 includes ego state data 133A and ego uncertainty data 134A for object #1, ego state data 133B and ego uncertainty data 134B for object #2, . . . , and ego state data 133N and ego uncertainty data 134N for object #N. The example remote V2X data 128 includes remote state data 129A and remote uncertainty data 130A for object #9, remote state data 129B and remote uncertainty data 130B for object #2, . . . , and remote state data 129N and remote uncertainty data 130N for object #N. For example, with respect to object #2, the remote uncertainty data 130B may have a lower uncertainty compared to that of the ego uncertainty data 134B.

The ego V2X data 132 can be updated based at least in part on the remote V2X data 128 by performing operations similar to those described above with reference to the update module 206 described above in FIG. 2. Similar description is not repeated here.

In some embodiments, whether a value of uncertainty is classified as "high uncertainty" or "low uncertainty" is relative to comparison to a threshold. For example, values of uncertainty that do not meet the threshold are classified as "high uncertainty" and values of uncertainty that do meet the threshold are classified as "low uncertainty." In some embodiments, uncertainty data such as the ego uncertainty data 134 or the remote uncertainty data 130 include digital data that describe values of uncertainty.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustra-

What is claimed is:

1. A method for an ego vehicle, the method comprising:
   determining, by a sensor set of the ego vehicle, ego Vehicle-to-Everything (V2X) data describing ego object information about a set of objects included in a roadway environment;
   receiving remote V2X data provided by a remote vehicle, wherein the remote V2X data describes remote object information about the set of objects from a perspective of the remote vehicle;
   determining uncertainty data describing an uncertainty about the ego object information for each object in the set of objects based at least in part on an analysis of the ego object information relative to the remote object information and a time that elapsed since the remote V2X data was received, wherein the uncertainty about the ego object information increases over time;
   determining a subset of ego object information to be used as updated ego V2X data based on the subset of ego object information meeting an uncertainty threshold; and
   updating the ego V2X data to form the updated ego V2X data.

2. The method of claim 1, further comprising transmitting a V2X message including the updated ego V2X data so that a receiver of the V2X message only receives updated ego V2X data that meets the uncertainty threshold and the receiver has reduced uncertainty about the ego object information.

3. The method of claim 1, wherein the uncertainty about the ego object information is dependent on whether the object is stationary or mobile and the ego object information for a stationary object becomes less certain over time than a mobile object.

4. The method of claim 2, wherein updating the ego V2X data to form the updated ego V2X data includes applying an uncertainty criterion as an information suppressing technique that is operable to prevent redundant ego object information from being included in the V2X message so that a load of a network that transmits the V2X message is reduced.

5. The method of claim 1, wherein the ego V2X data includes (1) ego state data describing a first state of the set of objects from a perspective the ego vehicle and (2) ego uncertainty data describing a first uncertainty of the first state from the perspective of the ego vehicle.

6. The method of claim 5, wherein the first uncertainty of the first state is a function of an accuracy of the sensor set.

7. The method of claim 5, wherein the remote V2X data includes (1) remote state data describing a second state of the set of objects from the perspective of the remote vehicle and (2) remote uncertainty data describing a second uncertainty of the second state from the perspective of the remote vehicle.

8. The method of claim 7, wherein the first state describes the set of objects at a different time from the second state thereby making the subset of ego object information corresponding to the first state more certain than the ego object information corresponding to the second state.

9. The method of claim 7, wherein the analysis compares the first state and the first uncertainty to the second state and the second uncertainty.

10. A system comprising:
    an onboard vehicle computer system of an ego vehicle including a non-transitory memory storing computer code which, when executed by the onboard vehicle computer system, causes the onboard vehicle computer system to:
    determine, by a sensor set of the ego vehicle, ego Vehicle-to-Everything (V2X) data describing ego object information about a set of objects included in a roadway environment;
    receive remote V2X data provided by a remote vehicle, wherein the remote V2X data describes remote object information about the set of objects from a perspective of the remote vehicle;
    determine uncertainty data for each object in the set of objects describing an uncertainty about the ego object information based at least in part on an analysis of the ego object information relative to the remote object information and a time that elapsed since the remote V2X data was received, wherein the uncertainty about the ego object information increases over time;
    determine a subset of ego object information to be used as updated ego V2X data based on the subset of ego object information meeting an uncertainty threshold; and
    update the ego V2X data to form the updated ego V2X data.

11. The system of claim 10, wherein the computer code, when executed by the onboard vehicle computer system, causes the onboard vehicle computer system further to:
    transmit a V2X message including the updated ego V2X data so that a receiver of the V2X message only receives updated ego V2X data that meets the uncertainty threshold satisfy the uncertainty criterion and the receiver has reduced uncertainty about the ego object information.

12. The system of claim 10, wherein the uncertainty about the ego object information is dependent on whether the object is stationary or mobile and the ego object information for a stationary object becomes less certain over time than a mobile object.

13. The system of claim 11, wherein the computer code, when executed by the onboard vehicle computer system, causes the onboard vehicle computer system to update the ego V2X data to form the updated ego V2X data at least by:
    applying an uncertainty criterion as an information suppressing technique that is operable to prevent redundant ego object information from being included in the V2X message so that a load of a network that transmits the V2X message is reduced.

14. The system of claim 10, wherein the ego V2X data includes (1) ego state data describing a first state of the set of objects from a perspective the ego vehicle and (2) ego uncertainty data describing a first uncertainty of the first state from the perspective of the ego vehicle.

15. The system of claim 14, wherein the first uncertainty of the first state is a function of an accuracy of the sensor set.

16. The system of claim 14, wherein the remote V2X data includes (1) remote state data describing a second state of the set of objects from the perspective of the remote vehicle and (2) remote uncertainty data describing a second uncertainty of the second state from the perspective of the remote vehicle.

17. The system of claim 16, wherein the analysis compares the first state and the first uncertainty to the second state and the second uncertainty.

18. A computer program product comprising a non-transitory memory of an onboard vehicle computer system of an ego vehicle storing computer-executable code that, when executed by a processor, causes the processor to:

determine, by a sensor set of the ego vehicle, ego Vehicle-to-Everything (V2X) data describing ego object information about a set of objects included in a roadway environment;

receive remote V2X data provided by a remote vehicle, wherein the remote V2X data describes remote object information about the set of objects from a perspective of the remote vehicle;

determine uncertainty data describing an uncertainty about the ego object information for each object in the set of objects based at least in part on an analysis of the ego object information relative to the remote object information and a time that elapsed since the remote V2X data was received, wherein the uncertainty about the ego object information increases over time;

determine a subset of ego object information to be used as updated ego V2X data based on the subset of ego object information meeting an uncertainty threshold; and update the ego V2X data to form the updated ego V2X data.

19. The computer program product of claim 18, wherein the computer-executable code, when executed by the processor, causes the processor further to:

transmit a V2X message including the updated ego V2X data so that a receiver of the V2X message only receives updated ego V2X data that meets the uncertainty threshold and the receiver has reduced uncertainty about the ego object information.

20. The computer program product of claim 18, wherein the uncertainty about the ego object information is dependent on whether the object is stationary or mobile and the ego object information for a stationary object becomes less certain over time than a mobile object.

* * * * *